United States Patent [19]
Pang

[11] Patent Number: 5,826,106
[45] Date of Patent: Oct. 20, 1998

[54] HIGH PERFORMANCE MULTIFUNCTION DIRECT MEMORY ACCESS (DMA) CONTROLLER

[75] Inventor: Jianhua Pang, Arlington, Tex.

[73] Assignee: National Semiconductor Corporation, Santa Clara, Calif.

[21] Appl. No.: 797,034

[22] Filed: Feb. 10, 1997

Related U.S. Application Data

[62] Division of Ser. No. 453,076, May 26, 1995, abandoned.

[51] Int. Cl.$^6$ ........................................................ G06F 9/00
[52] U.S. Cl. ............................ 395/845; 395/555; 395/559
[58] Field of Search ................................. 395/821–848, 395/558–560

[56] References Cited

U.S. PATENT DOCUMENTS

| | | | |
|---|---|---|---|
| 4,181,938 | 1/1980 | Suzuki et al. | 364/200 |
| 4,245,305 | 1/1981 | Gechele et al. | 364/200 |
| 4,424,565 | 1/1984 | Larson | 364/200 |
| 4,782,439 | 11/1988 | Borkar et al. | 364/200 |
| 4,984,195 | 1/1991 | Nakamura et al. | 364/200 |
| 4,999,769 | 3/1991 | Costes et al. | 398/845 |
| 5,005,121 | 4/1991 | Nakada et al. | 364/200 |
| 5,031,097 | 7/1991 | Kitakami et al. | 364/200 |
| 5,067,075 | 11/1991 | Sugano et al. | 395/425 |
| 5,189,319 | 2/1993 | Fung et al. | 307/452 |
| 5,204,953 | 4/1993 | Dixit | 395/400 |
| 5,254,888 | 10/1993 | Lee et al. | 307/480 |
| 5,259,006 | 11/1993 | Price et al. | 375/107 |
| 5,367,639 | 11/1994 | Sodos | 395/275 |
| 5,381,538 | 1/1995 | Amini et al. | 395/483 |
| 5,392,391 | 2/1995 | Caulk, Jr. et al. | 395/162 |
| 5,404,473 | 4/1995 | Papworth et al. | 395/375 |
| 5,408,626 | 4/1995 | Dixit | 395/400 |
| 5,438,665 | 8/1995 | Taniai et al. | 395/845 |
| 5,535,418 | 7/1996 | Suzuki | 398/845 |
| 5,548,786 | 8/1996 | Amini et al. | 395/842 |
| 5,548,787 | 8/1996 | Okamura | 398/845 |
| 5,577,214 | 11/1996 | Bhattacharya | 395/287 |
| 5,630,172 | 5/1997 | Ami et al. | 398/845 |
| 5,671,443 | 9/1997 | Stauffer et al. | 398/845 |

OTHER PUBLICATIONS

Serra, Micaela & Dervisoglu, Bulent I, "Testing", Chapter 79, *The Electrical Engineering Handbook*, Richard C. Dorf, Editor–in–Chief, pp. 1808–1837, CRC Press.

L–T Wang et al., "Feedback Shift Registers For Self–Testing Circuits", *VSLI Systems Design*, Dec. 1986.

Masakazu Shoji, "CMOS Dynamic Gates", Chapter 5, *AT&T CMOS Digital Circuit Technology*, Prentice Hall, 1988, pp. 210–257.

Guthrie, Charles, "Power–On Sequencing For Liguid Crystal Displays; Why, When, And How", *Sharp Application Notes*, Sharp Corporation, 1994, pp. 2–1 thru 2–9.

Bernd Moeschen, "NS32SP160 –Feature Communication Controller Architecture Specification", *National Semiconductor*, Rev. 1.0, May 13, 1993.

(List continued on next page.)

*Primary Examiner*—Christopher B. Shin
*Attorney, Agent, or Firm*—Limbach & Limbach L.L.P.

[57] ABSTRACT

A direct memory access (DMA) controller having memory to memory data transfer capability, a programmable fixed priority scheme, a programmable wait state, a buffer chaining mode data transfer capability, a cascade-master mode, separate channels for internal and external devices, and a programmable 8 or 16 bit requester bus size. The DMA controller includes a channel circuit connected to transfer data to and from a port, a CPU interface, a bus connected to the channel circuit and to the CPU interface to transfer data therebetween, a state machine which generates a clock signal that is used for transferring data from the channel circuit across the bus to the CPU interface, the state machine having a programmable wait state which delays the transfer of data for a preprogrammed number of clock cycles, and a data mode register which is used for setting the preprogrammed number of clock cycles.

13 Claims, 23 Drawing Sheets

OTHER PUBLICATIONS

Agarwal, Rakesh K., *80×86 Architecture and Programming, vol. II: Architecture Reference*, Chapter 4, Prentice Hall, 1991, pp. 542–543.

Intel486 Microprocessor Family Programmer's Reference Manual, Intel Corporation, 1993.

"8237A High Performance Programmable DMA Controller (8237A, 8237A-4, 8237A-5)", *Peripheral Components*, Intel, 1992, pp. 3–14 thru 3–50.

Kane, Gerry, "R2000 Processor Programming Model", Chapter 2, *MIPS RISC Architecture*, MIPS Computer Systems, Inc.

Hennessy, John et al., "Interpreting Memory Addresses", *Computer Architecture A Quantitative Approach*, pp. 95–97, Morgan Kaufman Publishers, Inc. 1980.

*PowerPC601 Reference Manual*, IBM, 1994, Chapter 9, "System Interface Operation", pp. 9–15 thru 9–17.

Intel Corp. Microsoft Corp., *Advanced Power Management (APM) BIOS Interface Specification*, Revision 1.1, Sep. 1993.

Intel Corporation, *i486 Micro Processor Hardware Reference Manual*, Processor Bus, pp. 3–28 thru 3–32.

Note: A DRAM Page Hit is assumed for this timing diagram.

Note: A DRAM Page Hit is assumed for this timing diagram.

Note: A 3 Clock DRAM Page Miss is assumed for this timing diagram.

Note: An external no wait state SRAM cycle is assumed for this timing diagram.

Note: A DRAM Page Hit is assumed for this timing diagram.

Note: A DRAM Page Hit is assumed for this timing diagram.

Note: A DRAM Page Hit is assumed for this timing diagram.

Note: A DRAM Page Hit is assumed for this timing diagram.

Note: A DRAM Page Hit is assumed for this timing diagram.

Note: A DRAM Page Hit is assumed for this timing diagram.
*EOP has the same timing as TC, except it is the responsibility of the DMA Requester to drive EOP active low.

HIGH PERFORMANCE MULTIFUNCTION DIRECT MEMORY ACCESS (DMA) CONTROLLER

This is a divisional U.S. patent application of application Ser. No. 08/453,076 filed May 26, 1995, now abandoned.

BACKGROUND OF THE INVENTION

1. Field of the Invention

The present invention relates to direct memory access (DMA) controllers, and more particularly, to a DMA controller having features and modes of operation which make it ideal for incorporation into a single integrated circuit (IC) having an on-board microprocessor and/or on-board peripherals.

2. Description of the Related Art

A DMA controller is a device which transfers data from a computer system's memory to some other location (and vice versa), without the intervention of the central processing unit (CPU). A DMA controller can issue commands to the memory that behave exactly like the commands issued by the processor. It can be used to connect one or more I/O ports directly to memory so that data can be transferred between these ports and memory without going through the processor, and with no direct program intervention. Instead, the I/O data stream passes through the DMA controller, but much faster and more efficiently than through the processor because the DMA channel is specialized to the data-transfer task.

Conventional DMA controllers normally have one or more independent channels. Each channel contains an address register, a control register, and a byte counter for use in transferring data between an external device or I/O port and memory. In order to perform such data transfers DMA controllers normally have two separate bus connections. One bus connection is to the CPU local bus which provides access to the system memory, and the other bus connection is to the I/O ports which provides access to the external devices.

Two bus connections is adequate for conventional DMA controllers because all I/O ports are external to the DMA controller. However, if a conventional DMA controller is incorporated into a single IC which includes an on-board CPU and on-board peripherals, two bus connections is no longer adequate. Specifically, if the DMA controller is to be capable of transferring data to and from devices internal and external to the IC chip, another bus connection is needed. Furthermore, conventional DMA controllers do not have certain modes of operation and features which enhance operation when the controller is used in such an environment, or when the controller is used as a stand-alone device.

Thus, there is a need for a DMA controller having additional bus connections, features, and modes of operation which improve its efficiency whether it is incorporated into a single IC having on-board system components or it is used as a stand-alone device.

SUMMARY OF THE INVENTION

The present invention provides a DMA controller having memory to memory data transfer capability, a programmable fixed priority scheme, a programmable wait state, a buffer chaining mode data transfer capability, a cascade-master mode, separate channels for internal and external devices, and a programmable 8 or 16 bit requester bus size.

In one embodiment the DMA controller includes a channel circuit connected to transfer data to and from a port, the channel circuit having a target address register for storing the address of a target memory location and a requester address register for storing the address of a requestor memory location. A CPU interface and a bus connected to the channel circuit and to the CPU interface are used to transfer data therebetween. A state machine generates timing signals used to transfer data from the requestor memory location, across the bus, to the target memory location.

In another embodiment, a DMA controller includes a plurality of channel circuits connected to transfer data to and from a plurality of ports. A priority resolve circuit receives a plurality of data request signals corresponding to the plurality of channel circuits, which resolves priority among the plurality of channels when more than one data request signal is received, and which generates and sends a data acknowledge signal to a winning channel in response to priority being resolved, the priority resolve circuit having a programmable fixed priority scheme wherein the lowest priority can be assigned to any one of the plurality of channels. A command register is connected to the priority resolve circuit for designating which of the plurality of channels has the lowest priority.

In another embodiment, a DMA controller includes a channel circuit connected to transfer data to and from a port. A CPU interface and a bus are connected to the channel circuit and to the CPU interface to transfer data therebetween. A state machine generates a clock signal that is used for transferring data from the channel circuit across the bus to the CPU interface, the state machine has a programmable wait state which delays the transfer of data for a preprogrammed number of clock cycles. A data mode register is used for setting the preprogrammed number of clock cycles.

In another embodiment, a method of transferring data from a peripheral device to a plurality of target addresses, includes the steps of: programming a base target address register with a first base target address; programming a base count register with a first base count value; transferring the first base target address to a current target address register; transferring the first base count value to a current count register; starting a first data transfer using the first base target address and the first base count value; programming the base target address register with a second base target address during the first data transfer; programming the base count register with a second base count value during the first data transfer; transferring the second base target address to the current target address register upon conclusion of the first data transfer; and transferring the second base count value to the current count register upon conclusion of the first data transfer.

In another embodiment, a DMA controller includes a channel circuit connected to transfer data to and from a port, the channel circuit having a base target address register, a current target address register, a base count register, and a current count register. A state machine has a chaining mode which permits the base target and base count registers to be updated while the current target and current count registers are used to transfer data. A chaining mode register is connected to the state machine for enabling and disabling the chaining mode.

In another embodiment, a DMA controller includes a channel circuit connected to transfer data to and from a port, the channel circuit having an address register for storing an address of a target device. An address bus is connected to the address register for carrying the address of the target device.

A state machine provides a cascade master mode for the channel during which the address bus is switched into a high impedance state. A channel mode register is connected to the state machine for enabling the cascade-master mode.

In another embodiment, a DMA controller includes a semiconductor die, a first port integrated into the semiconductor die, and a first channel circuit integrated into the semiconductor die and connected to transfer data to and from the first port. A second channel circuit is integrated into the semiconductor die and connected to transfer data to and from a second port located external to the semiconductor die. A CPU interface and a bus connected to the first channel circuit, the second channel, and the CPU interface transfers data therebetween.

In another embodiment, a DMA controller includes a set of data latches which receives data from a first data bus having a width of n bits, the data latches separating the first data bus into second and third data buses which each have a width of less than n bits. A multiplexer is connected to multiplex the second and third data buses together to form a fourth data bus having a width less than n bits wide. An output buffer circuit receives the second and fourth data buses.

A better understanding of the features and advantages of the present invention will be obtained by reference to the following detailed description of the invention and accompanying drawings which set forth an illustrative embodiment in which the principles of the invention are utilized.

DETAILED DESCRIPTION OF THE PREFERRED EMBODIMENT

Figure 1:
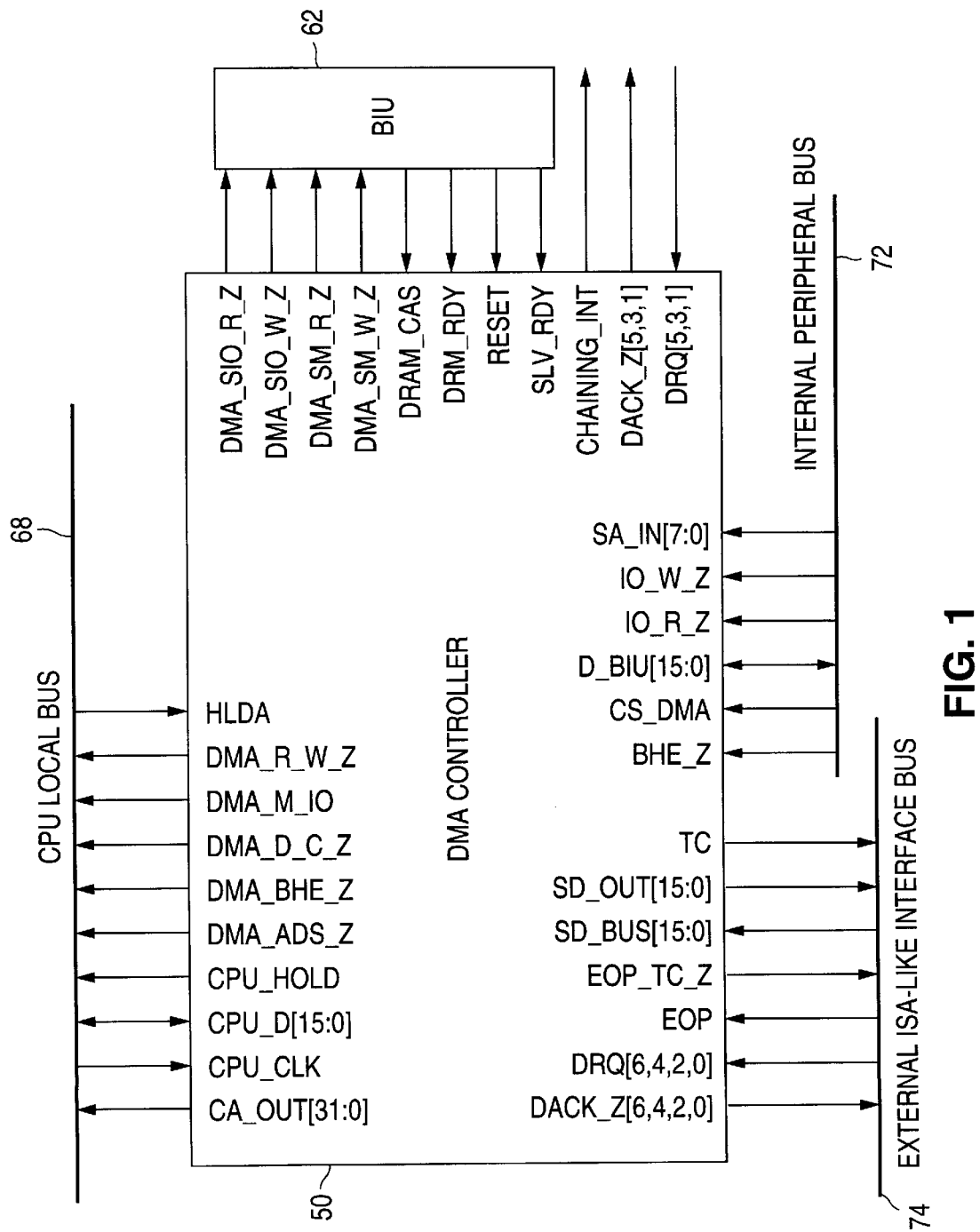
FIG. 1 is a block diagram illustrating a DMA controller in accordance with the present invention.

FIG. 1 shows a DMA controller 50 in accordance with the present invention. The DMA controller 50 is a high speed 16-bit controller with seven independent channels. Its resources are controlled by several programmable registers. Processor independent data transfers are performed at a maximum data rate of 2 bytes per 2 clock cycles. For example, a 25 MHz clock yields a 25 megabyte per second transfer rate.

Figure 2:
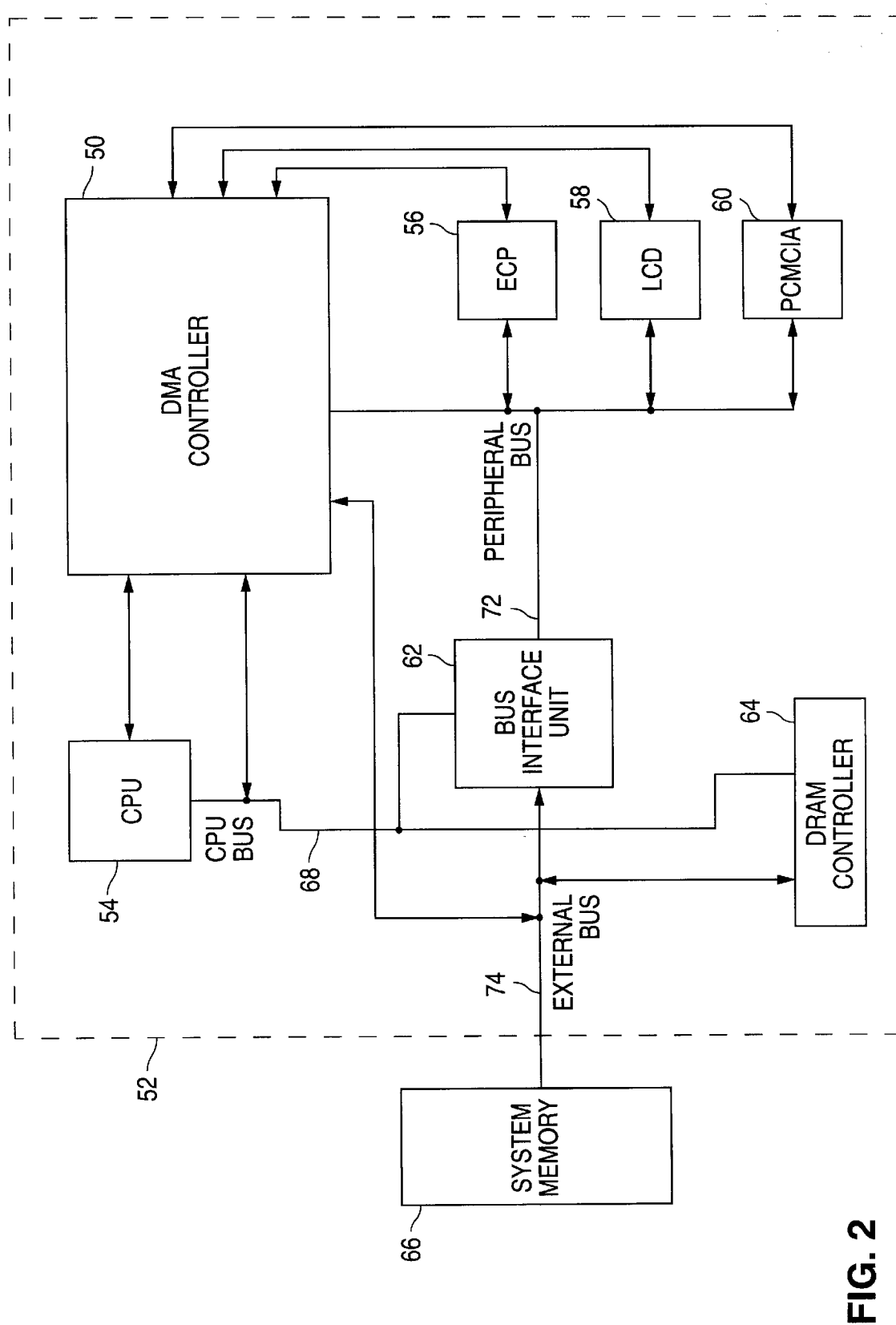
FIG. 2 is a block diagram illustrating the DMA controller shown in FIG. 1 incorporated with other components into a single IC.
Figure 3:
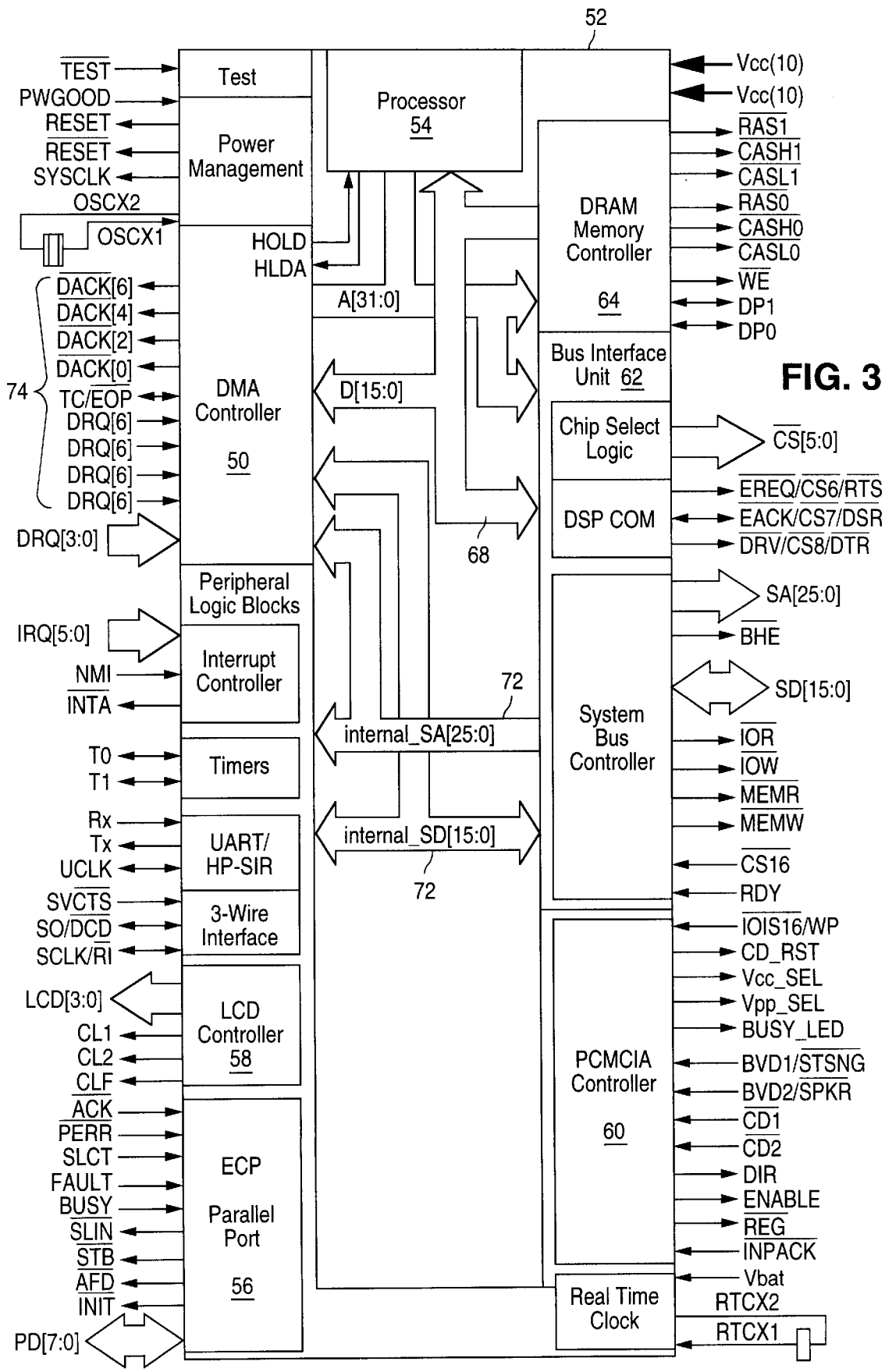
FIG. 3 is a block diagram illustrating the single IC shown in FIG. 2 in more detail.

Referring to FIGS. 2 and 3, the DMA controller 50 is ideal for being incorporated into a single IC chip 52 having an on-board CPU 54 and on-board peripherals, such as, for example, an ECP (extended capabilities port) parallel port 56, an LCD controller 58, and a PCMCIA controller 60. The single IC chip 52 may also include, for example, a bus interface unit 62 and a DRAM controller 64 for supporting an external system memory 66. It should be well understood, however, that the single IC chip 52 into which the DMA controller 50 may be incorporated may include additional or fewer of the peripherals and other components which are shown in FIGS. 2 and 3. Furthermore, although the following discussion assumes that the DMA controller 50 is incorporated into the single IC chip 52, it should be well understood that such incorporation is not a requirement of the present invention. Specifically, the DMA controller 50 may be contained in its own or several IC chips and used as a stand alone device.

An example of a single IC chip 52 is described in the data sheet entitled "Elentari Optimized 32-bit 486-class Controller With On-chip Peripherals for Embedded Systems", authored by National Semiconductor Corporation of Santa Clara, Calif., a copy of which is attached hereto as Appendix A and is incorporated herein by reference. Also attached hereto as Appendix B is a copy of a document entitled "Elentari Core Internal Bus Spec" which is also incorporated herein by reference. Finally, attached hereto as Appendix C is a copy of a document entitled "Internal Peripheral Bus Signals" which is also incorporated herein by reference.

It should be noted that the IC chip 52 may include an output signal DMA[1:0] which indicates, by a two-bit encoded value which, if any, of the three on-chip DMA channels is active. The DMA[1:0] signal is output combinationally following the on-chip DACK signals.

| Code | Interpretation |
| --- | --- |
| 00 | None |
| 01 | LCD Controller |
| 10 | ECP Port |
| 11 | PCMCIA Controller |

The DMA[1:0] signal can be used by an in-circuit emulator to trace on-chip DMA accesses. In a production part, the DMA[1:0] signal is not brought out to the chip's signal pins.

As shown in FIGS. 1–3, the DMA controller 50 interfaces to four buses: the CPU local bus 68, the Bus Interface Unit (BIU) 62, the internal peripherals bus 72, and the external ISA-like bus 74. As used herein, the term "external" means external to the single IC chip 52, and the term "internal" means within the single IC chip 52. The DMA controller 50 includes seven independent DMA channels: four for external resources and three for internal peripherals. It should be understood that the DMA controller 50 may include more or fewer of each type of channel. The channel priority can be set to be fixed or rotated. Requestor and target addresses can be independently incremented and have a maximum addressable memory range of 64 Mbytes.

Three basic transfer modes, single, block, and demand, are provided giving the user a wide range of DMA options.

A cascade-master mode allows external masters to access the DMA controller 50, specifically, the ISA-like bus. DMA transfers can be from memory to memory, memory to I/O and I/O to memory. Memory to memory mode is supported via an internal 16-bit temporary data storage register. All DMA transfers are controlled by the status of DMA control registers. Each channel can be individually programmed to autoinitialize to its original condition upon receiving an end of process ($\overline{EOP}$) signal or by reaching a terminal count (TC). In addition to the three basic transfer modes, the controller also provides a buffer chaining mode allowing transfer of data from a peripheral to several different areas of memory within one transfer operation (or vice versa).

Channels 0, 2, 4, and 6 are for use with external peripherals or the system memory 66. They support memory to I/O, I/O to memory, and memory to memory modes. Channels 1, 3, and 5 are for the internal peripherals (e.g., the LCD controller 58, the ECP port 56, or the PCMCIA card slot 60). Channels 1 and 5 can be used for either the LCD controller 58 or the ECP port 56. Channel 3 can be used for the PCMCIA card slot 60 (including memory to memory modes). If Channel 3 is not being used for the PCMCIA card slot 60, it can be used for the LCD controller 58 or the ECP port 56. Each channel has associated DRQ[n] and $\overline{DACK}$[n] handshake signals. It should be well understood, however, that the channel assignments discussed herein are for only one example embodiment of the DMA controller 50; the number of channels and their specific assignments may be varied without departing from the scope of the present invention.

With respect to internal and external channels, the internal channel data bus is connected to the bus D_BIU[15:0]. DMA read operations to internal channels is through the bus D_BIU[15:0]. The DMA controller 50 generates DMA_SIO_R_Z in internal device read cycles. Before the rising edge of this strobe, the internal DMA device should provide data in the D_BIU bus. The DMA controller 50 will latch data from that bus and do the necessary byte alignments if the device is 8 bits or wider. In the following system memory write cycle, the DMA controller 50 will provide this latched and byte-swapped data in CPU local data bus. In internal DMA device write cycles, the DMA controller 50 will latch data in the CPU data bus when in system memory read cycle and provide necessary byte alignment if device is 8-bits or wider. The DMA controller 50 also puts data in the D_BIU bus for the following DMA device write cycle.

The external channel data bus is connected to the outside data bus SD_IN[15:0] and SD_OUT[15:0]. When in read cycle, the DMA latch data from SD_IN bus and then put them in the CPU data bus after byte alignment. When in write cycle, the DMA latches data from the CPU data bus and then puts it in the SD_OUT bus after byte alignment.

Figure 4:
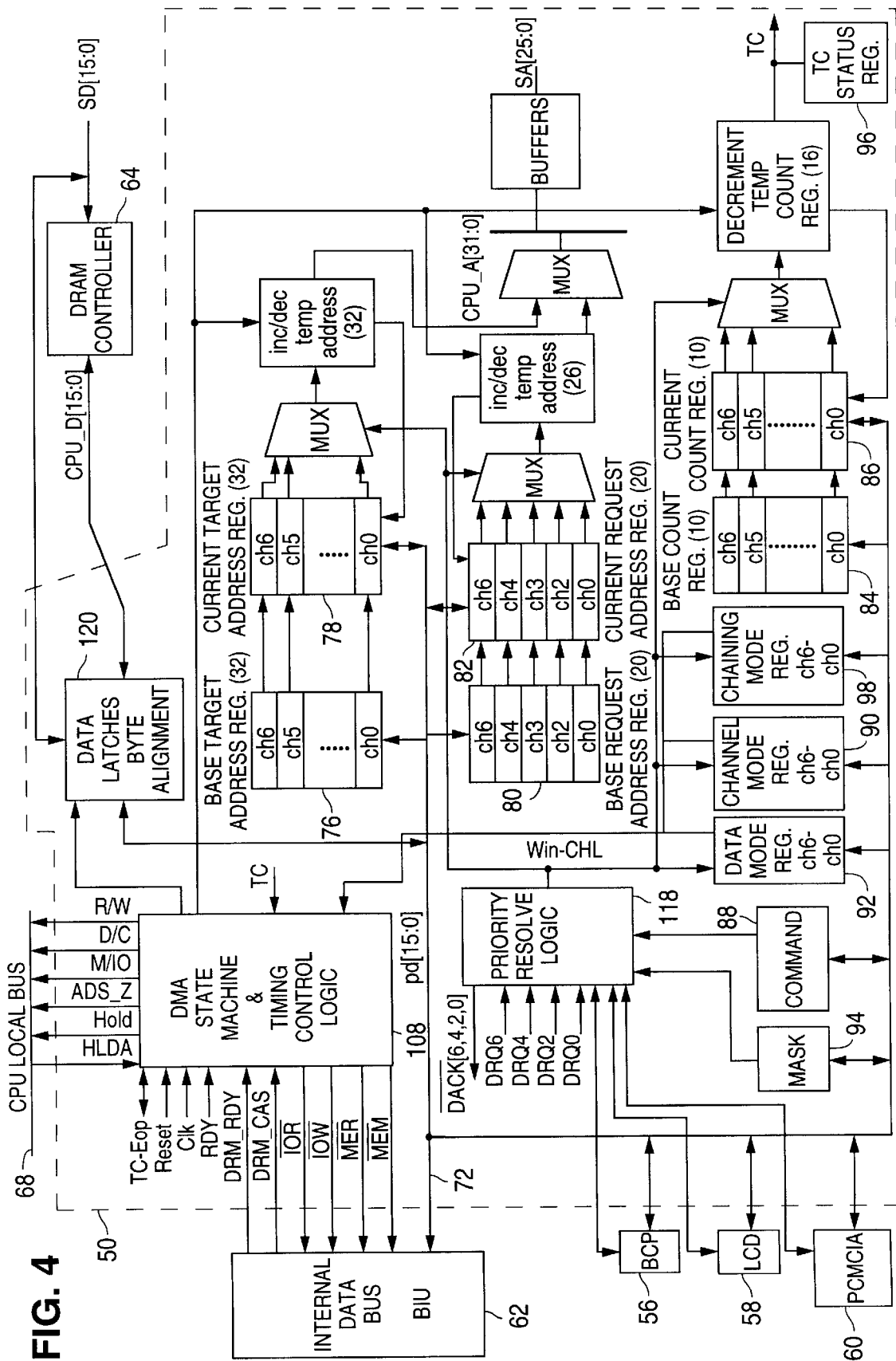
FIG. 4 is a block diagram illustrating the DMA controller shown in FIG. 1 in more detail.

Referring to FIG. 4, the DMA controller 50 keeps track of start and stop addresses through the following registers: The base target address register 76 holds a pointer to the original starting address of the target or system memory data location; the current target address register 78 holds a pointer to the current or updated address of the target data location (after each transfer, it is updated); the base requestor address register 80 holds a pointer to the starting address of the data in the DMA device (memory mapped only); the current requestor address register 82 holds a pointer to the current address of the data in the DMA device (memory mapped only); the base byte count register 84 holds the starting number of bytes to be transferred; and the current byte count register 86 holds the current or updated number of bytes left to be transferred. Target addresses are required for all transfers while requestor addresses are only required for memory to memory transfers.

As mentioned above, the DMA controller 50 supports three data transfer modes: single, block and demand. A fourth mode, cascade-master, is for relinquishing control of the external ISA-like bus 74 to an external master. This allows an external master to access the ISA-like bus 74, but it does not allow access to the single IC chip 52 on-board peripherals. In all cases, the DMA request and grant is performed using the data request DRQ[n] and data acknowledge $\overline{DACK}$[n] signals, and the type of transfer is set up by setting the appropriate bits in the DMA control registers, discussed below.

A DMA channel programmed for single transfer mode performs one transfer for each arbitration cycle. The DMA software programs the channel's base byte count register 84 with the appropriate number of bytes to transfer. The DMA controller 50 decrements (by 1 for byte transfers; by 2 for word transfers) the channel's current byte count register 86 and increments/decrements (by 1 for byte transfers; by 2 for word transfers) its current target address register 78 after each transfer. The transfer completes when the current byte count register 86 reaches terminal count or when an external end of process ($\overline{EOP}$) is received. Terminal count or $\overline{EOP}$ causes the current target address register 78 and current byte count register 86 to be reloaded from the base target address register 76 and the base byte count register 84, respectively, if the channel is programmed for autoinitialize. Otherwise, the channel will be masked off.

A DMA device requests a single transfer mode DMA transfer by asserting DRQ[n] high and holding it until $\overline{DACK}$[n] is asserted low. The DMA device may or may not hold DRQ[n] asserted throughout the single transfer. The system logic negates $\overline{DACK}$[n] and the DMA channel releases the CPU local bus 68 after the single transfer. If DRQ[n] remains asserted, the DMA controller 50 immediately requests the CPU local bus 68 again. The DMA arbitration controller performs the arbitration, and asserts the winning channel's $\overline{DACK}$[n] to signal the bus grant. The DMA channel then performs another single transfer. The current registers 78 and 86 hold the intermediate address and word count value between arbitration cycles.

A DMA channel programmed for block transfer mode performs a block transfer for each arbitration cycle. The DMA software programs the channel's base byte count register 84 with the appropriate number of bytes to transfer. The DMA controller 50 decrements (by 1 for byte transfers; by 2 for word transfers) the channel's current byte count register 86 and increments/decrements (by 1 for byte transfers; by 2 for word transfers) its current target address register 78 after each transfer. The transfer completes when the current byte count register 86 reaches terminal count or an external end of process ($\overline{EOP}$) is received. Terminal count or $\overline{EOP}$ causes the current registers 78 and 86 to be reloaded from the base registers 76 and 84 if the channel is programmed for autoinitialize. Otherwise, the channel will be masked until reprogrammed.

A DMA device requests a block mode DMA transfer by asserting DRQ[n] high and holding it until $\overline{DACK}$[n] is asserted low. The DMA device may or may not hold DRQ[n] asserted throughout the block transfer or may release DRQ[n] after sampling $\overline{DACK}$[n] asserted low.

A DMA channel programmed for demand transfer mode performs a group of transfers for each arbitration cycle. The user's DMA software programs the channel's base byte count register 84 for the appropriate number of transfers to perform. The DMA controller 50 decrements (by 1 for byte transfers; by 2 for word transfers) the channel's current byte count register 86 and increments/decrements (by 1 for byte transfers; by 2 for word transfers) its current target address register 78 after each transfer. The transfer continues until the device negates DRQ[n], the current byte count register 86 reaches terminal count or an external end of process ($\overline{EOP}$) is received. Terminal count or $\overline{EOP}$ causes the current registers 78 and 86 to be reloaded from the base registers 76 and 84 if the channel is programmed for autoinitialize. The negation of DRQ[n] interrupts the transfer. When the next DRQ[n] is asserted (and wins the arbitration), the transfer continues from that same point.

A DMA device requests a demand mode DMA transfer by asserting DRQ[n] high. The DMA device holds DRQ[n] asserted until it runs out of data or until the transfer terminates. DRQ[n] is sampled one clock before the end of the write cycle (either IOW, or MW) and thus to stop the next DMA cycle, DRQ[n] must be deasserted (DRQ[n]=0) at least one clock cycle before the end of the last DMA write cycle.

Figure 5:
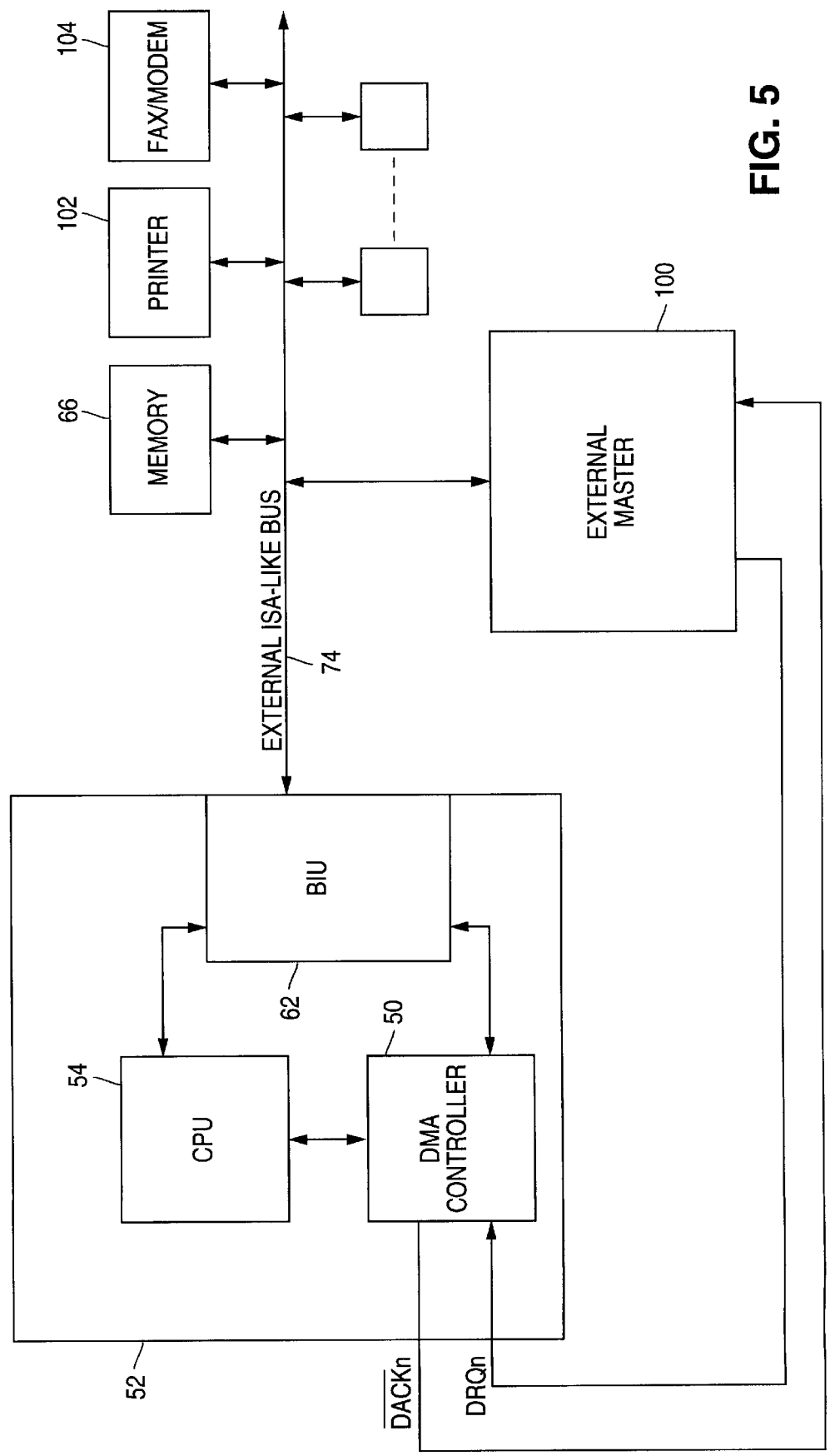
FIG. 5 is a block diagram illustrating the use of an external master with the DMA controller shown in FIG. 1.

The DMA controller 50 supports cascade-master mode. Referring to FIG. 5, an external master 100 can use this function to get control of the external ISA-like bus 74. Specifically, when the CPU 54 gives bus mastership to the DMA controller 50, the CPU 54 tri-states its address bus and control bus. If the external master 100 channel wins arbitration, the DMA controller 50 will also tri-state its address bus and control bus if the channel is programmed to cascade-master mode. Thus, in the cascade-master mode, the two possible bus masters, i.e., the CPU 54 and the DMA controller 50, are both tri-stated. The external master 100 gets control of the external ISA-like bus 74, as well as the devices attached to this bus, e.g., a printer 102, fax/modem 104, etc.

Figure 6:
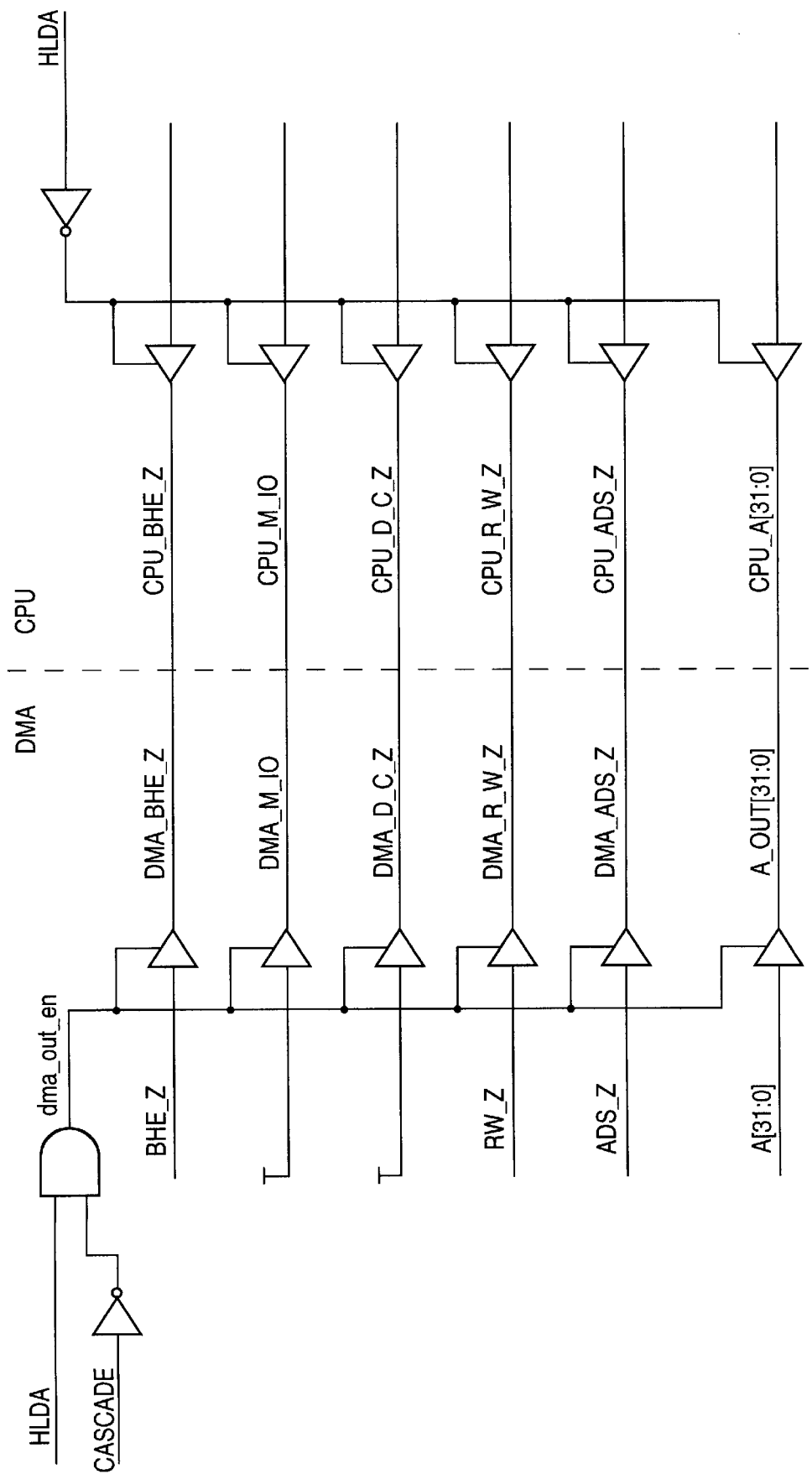
FIG. 6 is a detailed block diagram illustrating the circuitry used for the cascade master mode of operation.

An external DMA channel programmed for cascade-master mode will not perform any transfers for each arbitration cycle. Instead, the cascade-master mode allows the external bus master 100 to arbitrate for control of the external ISA-like interface bus 74. When the cascaded master 100 has been granted control (i.e. when its $\overline{DACK}$[n] is asserted low) the following signals will be tri-stated and remain tri-stated until DRQ[n] goes low again: $\overline{IOR}$, $\overline{IOW}$, $\overline{MEMR}$, $\overline{MEMW}$, SA[25:0], $\overline{SBHE}$, and SD[15:0]. FIG. 6 illustrates how the DMA state machine 108 performs the cascade-master mode.

An autoinitialize channel automatically loads the current target address register 78, current requestor address register 82 and current byte count register 86 from the base target address register 76, base requester address register 80, and base byte count register 84 each time the DMA controller 50 reaches terminal count or an external end of process ($\overline{EOP}$) is received. By programming a bit in the mode register, a channel can be set up for autoinitialization. The mask bit is not set at the end of a transfer when the channel is in autoinitialize mode. Following autoinitialize, the channel is ready to perform another DMA service without CPU intervention as soon as the DMA device requests and wins the CPU local bus 68 again.

Single, block and demand mode transfers may have two transfer types: write transfer type and read transfer type. A DMA write transfer reads from the system memory 66 (which may be either a DRAM or SRAM) and writes that data to the DMA requesting device. A DMA read transfer reads from the DMA requesting device and writes to the system memory 66.

Single, block and demand mode transfers support two DMA requester device types: I/O device type and memory device type. For a DMA requester that is programmed as an I/O device type, the DMA controller 50 will produce the appropriate I/O access strobe for accesses to the DMA requester ($\overline{IOR}$ for Read Transfer Types and $\overline{IOW}$ for Write Transfer Types). For a DMA requester that is programmed as a memory device type, the DMA controller 50 will produce the appropriate memory access strobe for accesses to the DMA requester ($\overline{MEMR}$ for Read Transfer Types and $\overline{MEMR}$ for Write Transfer Types).

The following table shows the maximum number of bytes that can be transferred by the various combinations of the DMA types. For maximum throughput performance, a single clock cycle DRAM memory hit is assumed for every access to the system memory 66 and no DMA arbitration time is considered.

| Device Type | Transfer Type | Maximum Transfer Rate (byte per clock) |
| --- | --- | --- |
| I/O | Read | 0.667 bytes per clock |
| I/O | Write | 1.0 byte per clock |
| Memory | Read | 0.5 bytes per clock |
| Memory | Write | 0.5 bytes per clock |

Formula: Time=(# of bytes to transfer)*(8-bits/Requester Bus Size)*(Clocks per Transfer)*(Clock period) Transfer Rate=(# of byte to transfer)/Time.

There are several programmable registers for controlling the operation of the DMA controller 50. They can be grouped logically and many have the same function, but for different channels.

Figure 7A:
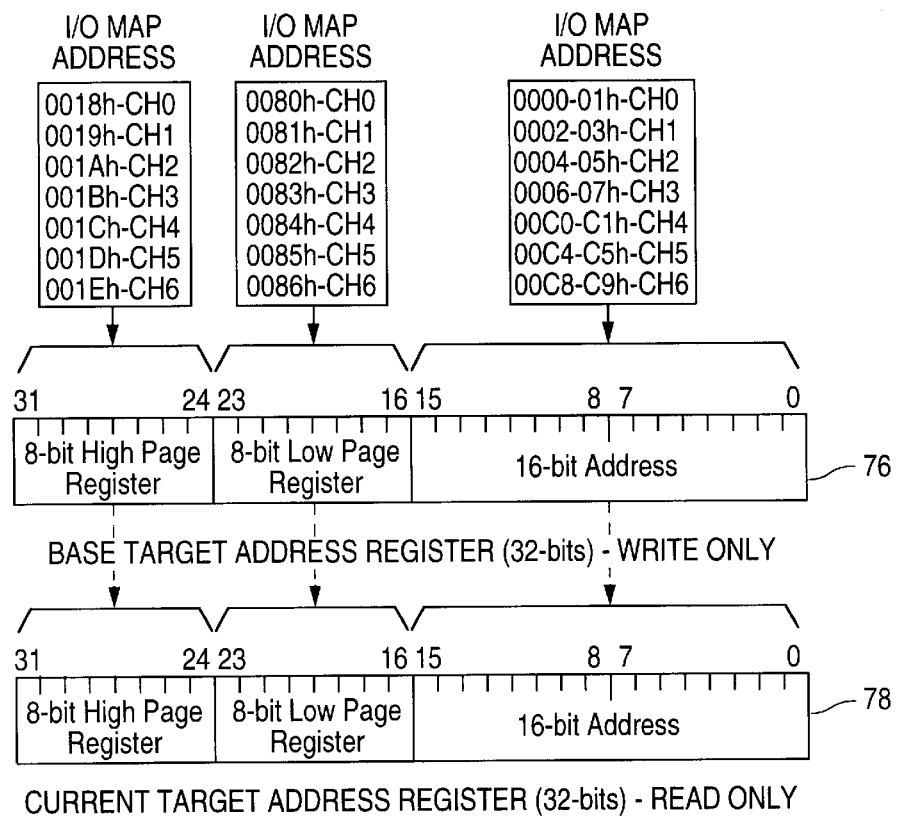
FIGS. 7A–7C are block diagrams illustrating the address registers shown in FIG. 4.
Figure 7B:
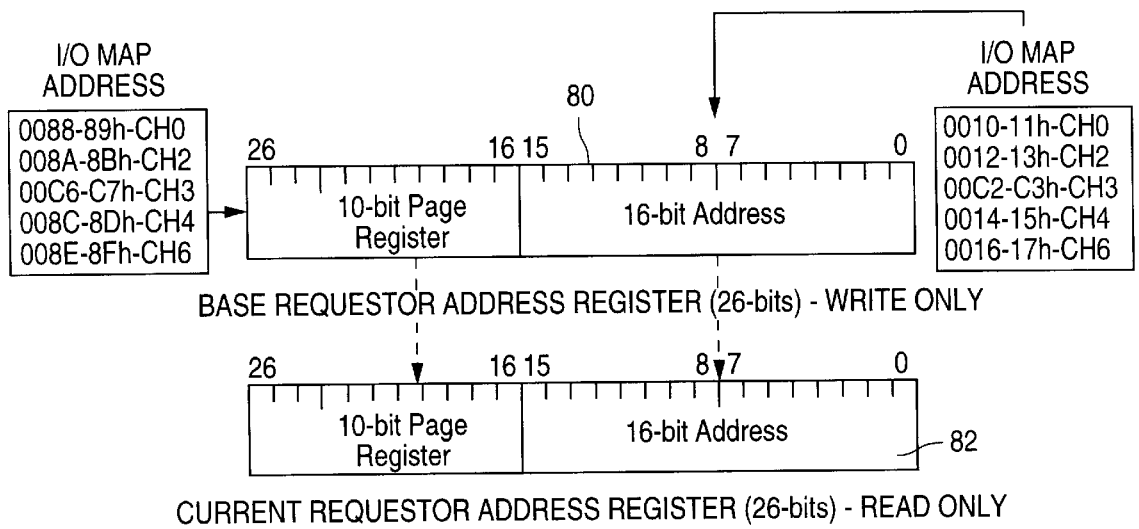
Figure 7C:
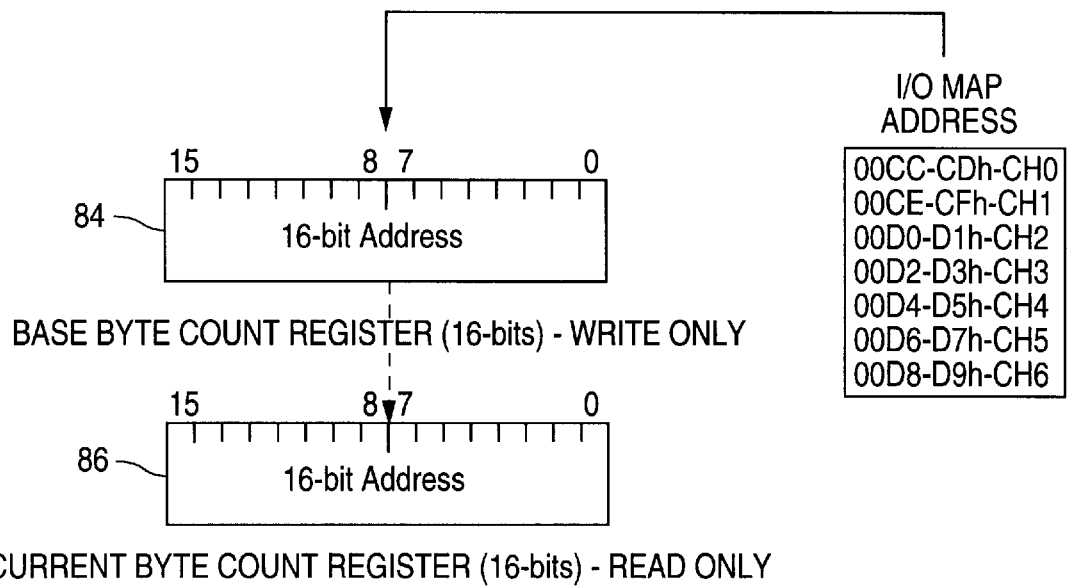

Referring to FIGS. 7A–7C, there are address registers for each channel. The DMA address registers consist of a set of base and current registers for each channel. The base target address register 76 holds the location in the system memory 66 from which or to which the data is to be transferred. The current target address register 78 holds the updated destination/source location (it is updated after each byte or word transfer). All seven DMA channels have a base and current target address register set 76 and 78.

The base registers 76, 80, and 84 are write only and are written once by the DMA controller software before the start of the DMA process. During each byte or word transfer, the current registers 78, 82, and 86 are updated automatically by the DMA controller logic. The current registers 78, 82, and 86 can be read by user software. The base and current registers 76, 80, 84 and 78, 82, 86, respectively, share the same I/O map locations; i.e., a write enters data into the base registers 76, 80, and 84, and a read returns the value of the current registers 78, 82, and 86. For example, a write to 0000-0001h writes a 16-bit value into the lower 16-bits of the base target address register 76. A read from 0000-0001h, obtains the value of the current target address register 78. The addresses for channels 0–3 are located in the lower portion of the I/O map. Because of convenience, the addresses for channels 4–6 are located in a non-contiguous area in the I/O map.

All seven DMA channels have a base and current target address register set 76 and 78. Only the five channels using memory to memory mode require the base and current requestor address registers 80 and 82. These channels are channels 0, 2, 3, 4, and 6 (the external peripheral or memory channels and the PCMCIA card slot 60 channel). These registers define the source/destination locations of the system memory 66 for transfers for memory mapped DMA devices. Thus, the channels which support memory to memory transfers each have registers which indicate the address of the destination, i.e., the base and current target address register set 76 and 78, as well as registers which indicate the address of the source, i.e., the base and current requestor address registers 80 and 82. These two sets of registers make memory to memory transfers possible.

During memory to memory transfer, the CPU address bus[31:0] will be switched from system memory address in system memory access cycle to DMA memory mapped device's memory in slave access cycle.

In DMA write cycle, CPU address will be stable one clock before the DMA_ADS_Z strobe goes active low and stays there until the DRAM_CAS_Z rising edge which indicates cycle finish. This DMA_ADS_Z rising edge will also decrement/increment the target address and switch the CPU address bus to the DMA device's memory. The CPU address bus will stay in the DMA device's memory until the DMA_MW_Z strobe goes inactive high which indicates slave cycle finish and the CPU address switches to system memory address again.

In the DMA read cycle, the CPU address bus will switch from the DMA memory mapped device memory address to system memory address on the rising edge of DMA_MR_Z and switch back on the rising edge of DRAM_CAS_Z.

In all types of transfers and for all seven channels, base and current byte count registers 84 and 86 are used. The base byte count register 84 holds the starting number of bytes to be transferred. As transfers are made, the DMA controller logic automatically updates the current byte count register 86. Again, the base byte count register 84 is write only, and the current byte count register 86 is read only. They share a single I/O map address (two locations per channel).

The base and current target address registers 76 and 78 each consist of two 8-bit page registers (high and low) and a lower 16-bit address. This combination yields a 4 Gigabyte address range. The base and current requestor address registers 80 and 82 each consist of one 10-bit page registers (high and low) and a lower 16-bit address. The base and current target address registers 76 and 78 are each 32-bit registers and are used by all seven DMA channels. The base and current requester address registers 80 and 82 are 26-bit registers and are used for memory to memory transfers and are needed for the five channels that support this mode (i.e., channels 0, 2, 3, 4, and 6). The base and current byte count registers 84 and 86 are 16-bit registers which provide transfers of up to 64K bytes. It should be noted that the base and current byte count registers 84 and 86 are linked, with base registers 84 being write-only, and the current registers 86 being read-only. Thus, they can share the same I/O address.

The command register 88 is an 8-bit write only register which controls the operation of the DMA controller 50. The command register 88 holds bits controlling priority modes and priorities as well as the gloable DMA controller enable/disable bit. It is preferably programmed by the CPU 54 and is cleared by reset or a master clear instruction. The reset value of this register is 18h. It is a write only register and has an I/O map address of 0008h.

The DMA controller 50 supports both fixed and rotating priority between its channels. In addition, the DMA controller 50 also supports programmable fixed priority. The command register 88 includes the programmable fixed priority bits. Specifically, priority between the channels of the DMA controller 50 can be programmed to be fixed, with any given channel having the highest priority and the next lowest numbered channel having the next highest, and so on. In other words, although a channel is programmed to be fixed priority, the user still has the choice of selecting which channel will be the lowest priority, with the next channel number being the highest priority. The user does not need to change the hardware connection in the application system if the priority order among the channels is to be changed. Furthermore, the priority order among the channels can be adjusted dynamically.

Alternatively, priority can be transferred in a rotated or "round-robin" manner. In the latter case, a channel is designated "first" and it gets the highest priority first. The next time, the next highest numbered channel gets the highest priority. The next time, the next highest numbered channel gets the highest priority, and so on.

Bits [7:5] of the command register 88 are reserved. Bits [4:2] are the programmable fixed priority bits. The value loaded into these bits determine the lowest priority channel when fixed priority is selected (bit 1 of this register equals 0). Whatever value (from 0–6) is placed in these bits sets that DMA channel as the lowest priority. The highest priority is next highest channel (in rotating order, i.e, 0, 1, 2, 3, 4, 5, 6, 0, 1, 2, 3, 4, 5, 6, 0, 1, 2, 3, 4, 5, 6, and so on). The reset default value of these three bits is $110_6$, making channel 6 the lowest priority in default mode and channel 0 the highest priority in default mode. If a value of 2 or $010_6$ is loaded into these bits, then channel 2 will be the lowest priority (and channel 3 the highest). If a value of 3 in loaded, channel 3 will be the lowest and channel 4 will be the highest, and so on. Bit [1] is used to set the priority mode. A 0 is for fixed priority, and a 1 is for rotating priority. Bit [0] is the controller enable/disable bit. A 0 disables the controller, and a 1 enables the controller.

Figure 8:
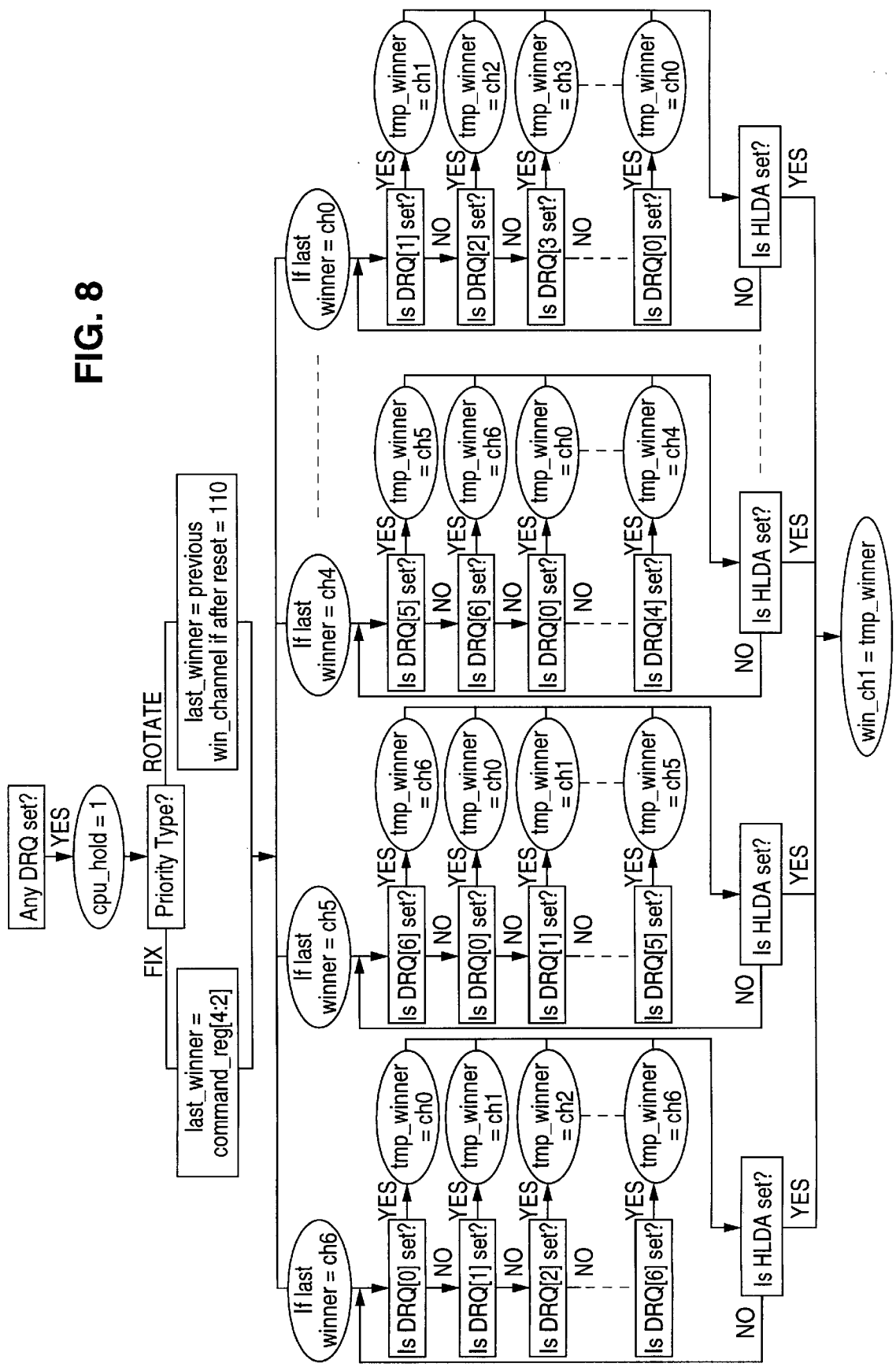
FIG. 8 is a flow diagram illustrating the priority resolve algorithm performed by the priority resolve logic shown in FIG. 4.
Figure 9:
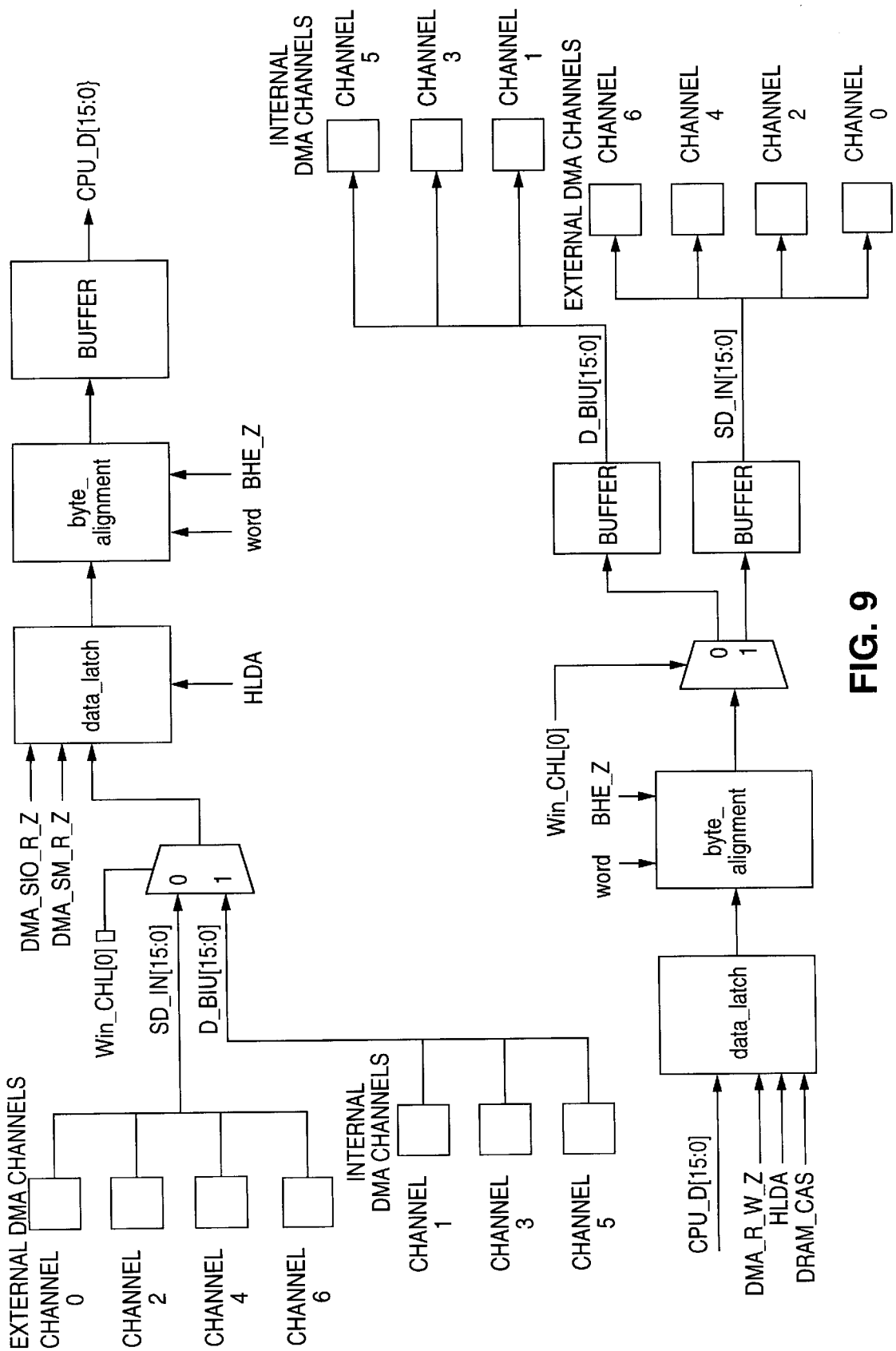
FIG. 9 is a detailed block diagram illustrating the DMA read and write cycles.

FIG. 8 illustrates the fix/rotate priority resolve algorithm. This algorithm can be performed by priority resolve logic which can be generated from the Verilog code shown in Appendix D which is attached hereto and which is incorporated herein by reference.

The channel mode registers 90 control the characteristics of each channel. Two registers are used to support all seven channels. Data transfer type, TC vs. EOP termination, requestor device type and transfer type are set in these write-only registers.

The Channel Mode Register is write-only and is used to set up the particular characteristics of the DMA channel. Channel programming is accomplished on a channel by channel basis, with the channel to be programmed selected by bits [0:1]. One register is used to select channels 0–3, and another register is used to select channels 4–6. Following a reset, all the bits which may be programmed via this register will be zeros. This register may share the same I/O address map location as the TC Status Register (a read only register); specifically, the I/O map address is 000Bh.

Bits [7:6] of the channel mode register 90 sets the data transfer mode; specifically, 00 for demand mode, 01 for single mode, 10 for block mode, and 11 for cascade-master mode. Bit [5] selects TC vs. $\overline{\text{EOP}}$; specifically, 0 sets the TC/$\overline{\text{EOP}}$ pin to operate as terminal count (TC), and 1 sets the TC/$\overline{\text{EOP}}$ pin to operate as end of process EOP input. Bit [4] sets the requestor device type; specifically, 0 for I/O, and 1 for memory. Bit [3] sets the transfer type; specifically, 0 for read, and 1 for write. Bit [2] disables/enables autoinitialization; specifically, 0 disables autoinitialization, and 1 enables autoinitialization. Bits [1:0] are used to select the channel to be programmed, according to the following table:

| Bits | Channel |
| --- | --- |
| 00 | channel 0 |
| 01 | channel 1 |
| 10 | channel 2 |
| 11 | channel 3 |

A second channel mode register is used to program channels 4–6. This register is also a write only register and has an I/O map address of 00DCh. Bits [7:2] of this register have the same functions as bits [7:2] of the first channel mode register. Bits [1:0] are used to select the channel to be programmed, according to the following table:

| Bits | Channel |
| --- | --- |
| 00 | channel 4 |
| 01 | channel 5 |
| 10 | channel 6 |
| 11 | reserved |

Two write-only data mode registers 92 set up the data timing parameters for each channel. The first data mode register 92 sets up the data timing and width parameters for DMA channels 0–3. Programming is accomplished the same as with the channel mode registers 90. Following a reset, all of the bits which may be programmed via the data mode registers will be zeros. This register shares I/O map address 0009h with the request status register (read-only). Bit [7] of the data mode register sets the requester address increment/decrement; specifically, 0 for decrement and 1 for increment. Bit [6] sets the target address increment/decrement; specifically, 0 for decrement and 1 for increment.

Bits [5:3] of the data mode registers 92 are used to set a programmable wait state. Specifically, for slower I/O devices the length of the I/O read and I/O write can be programmed. The DMA controller 50 will wait a certain amount of time, i.e., the programmable wait state, for the slave to give its slave ready signal. This allows a very slow family of devices to be used with the DMA controller 50. The length of the I/O read and I/O write are programmed by setting the number of clocks per transfer. Bits [5:3] are used to set the number of clocks per transfer according to the following table:

| Bits 5 4 3 | I/O Write | I/O Read | Memory (Read or Write) |
| --- | --- | --- | --- |
| 000 | 2 clocks | 3 clocks | 4 clocks |
| 001 | 4 clocks | 4 clocks | 4 clocks |
| 010 | 6 clocks | 6 clocks | 6 clocks |
| 011 | 8 clocks | 8 clocks | 8 clocks |
| 100 | 10 clocks | 10 clocks | 10 clocks |
| 101 | 12 clocks | 12 clocks | 12 clocks |
| 110 | 14 clocks | 14 clocks | 14 clocks |
| 111 | 16 clocks | 16 clocks | 16 clocks |

Figure 19:
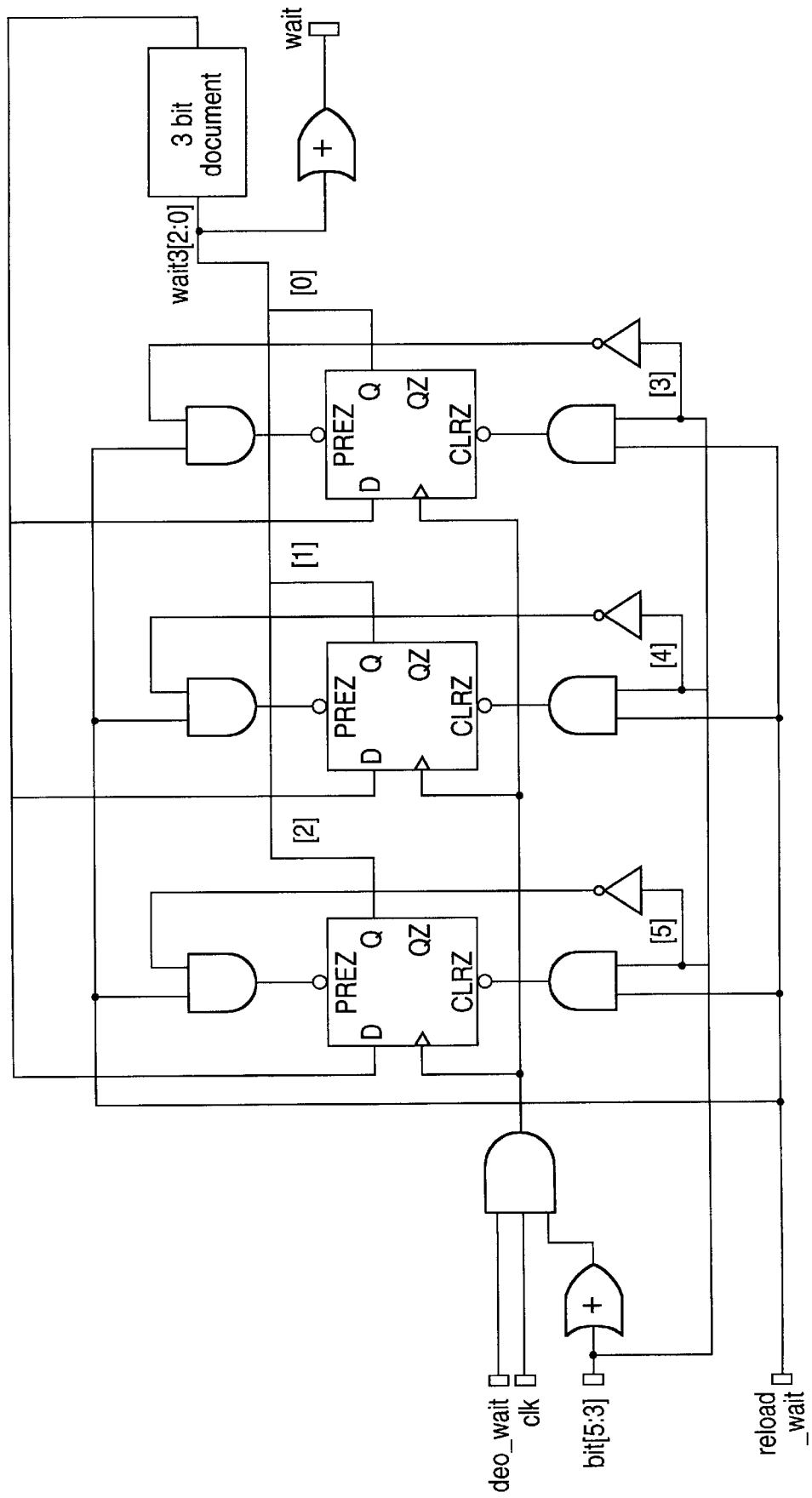
FIG. 19 is a block diagram illustrating the generation of the DMA wait signals.
Figure 20:
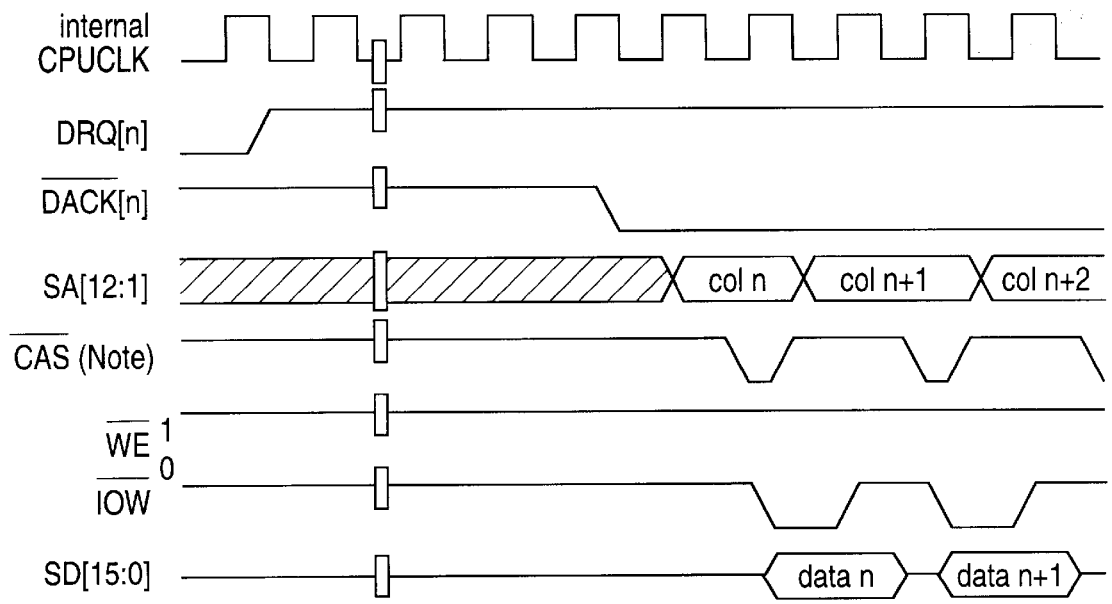
FIGS. 20–30 are timing diagrams illustrating the operation of the DMA controller shown in FIG. 4.
Figure 21:
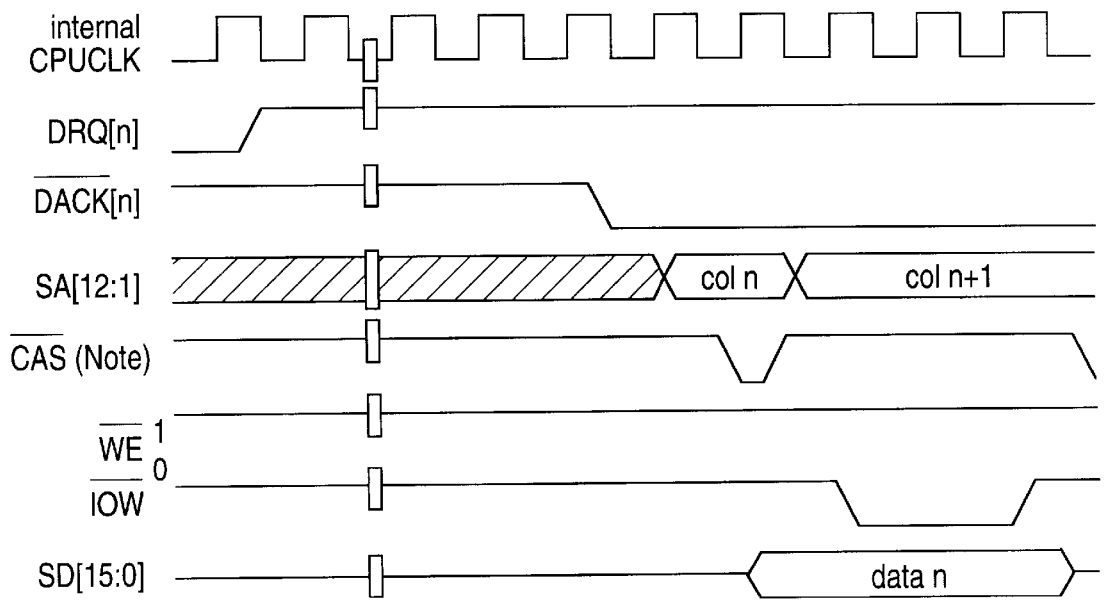
Figure 22:
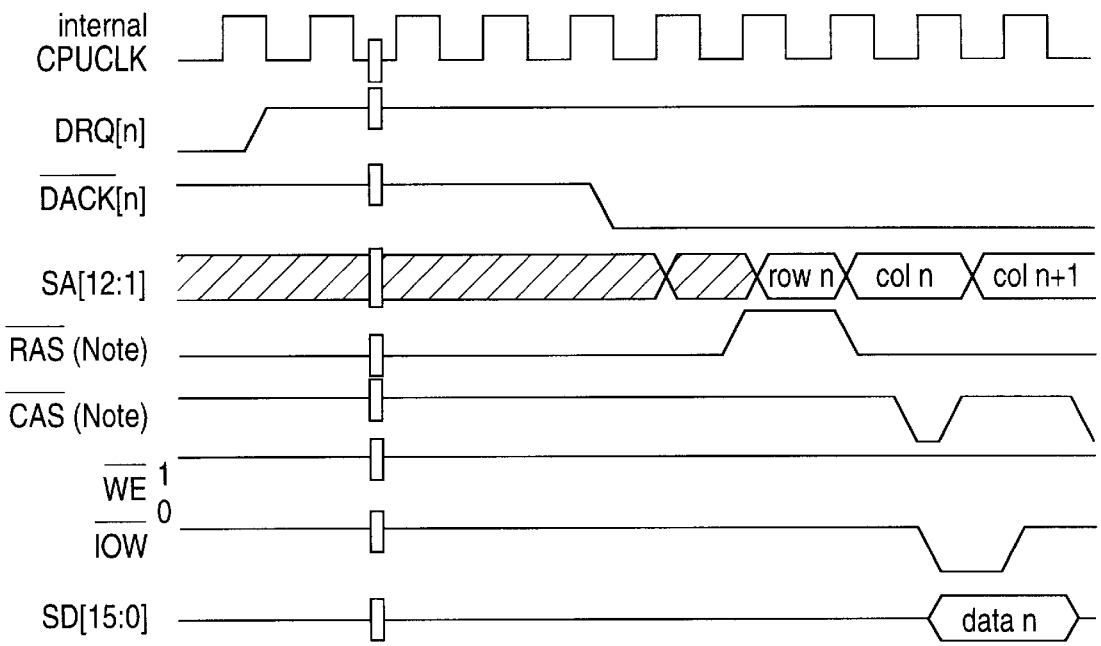
Figure 23:
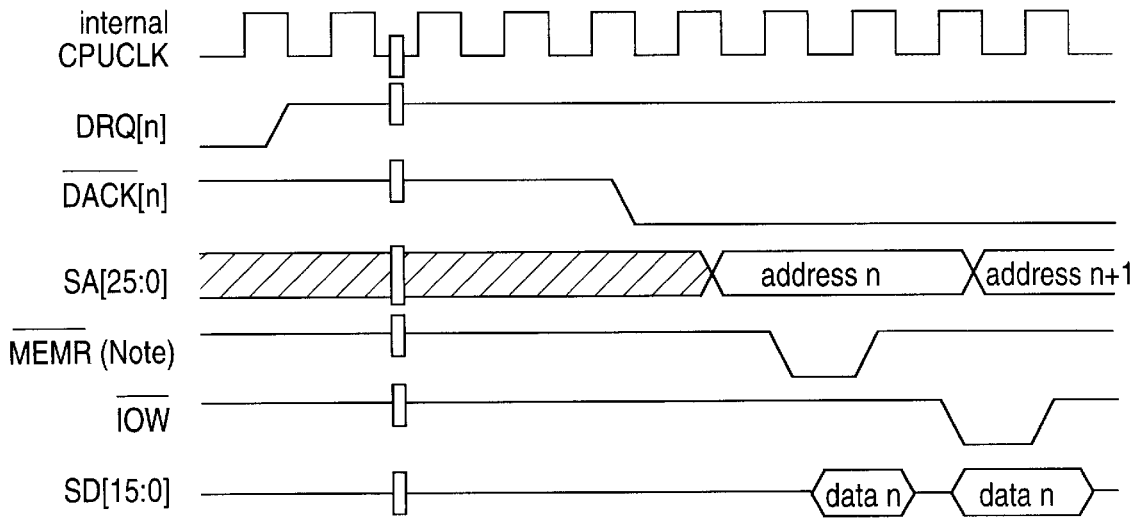
Figure 24:
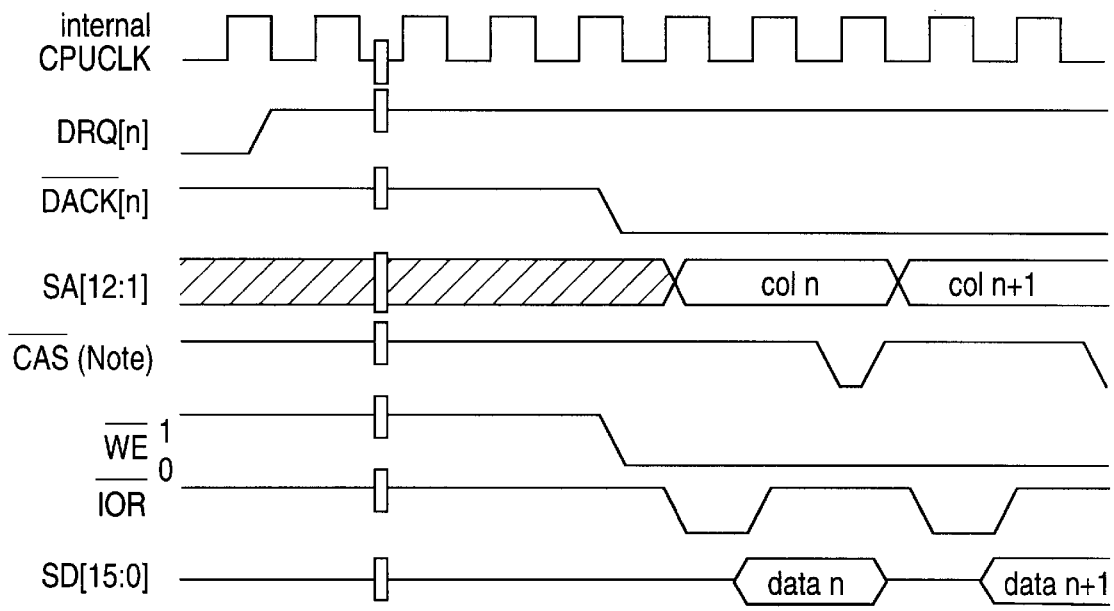
Figure 25:
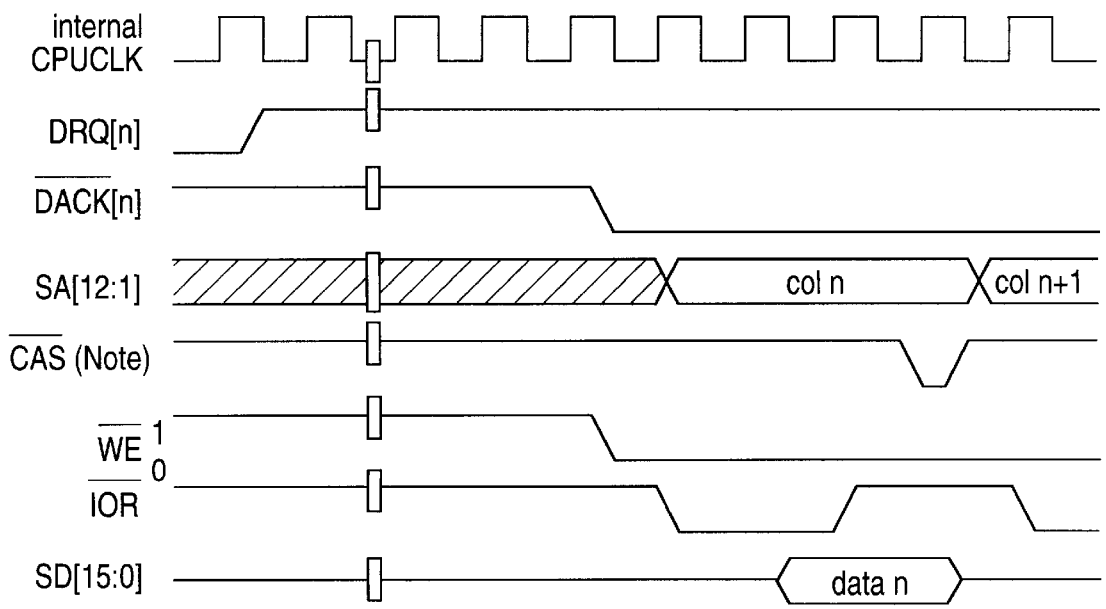
Figure 26:
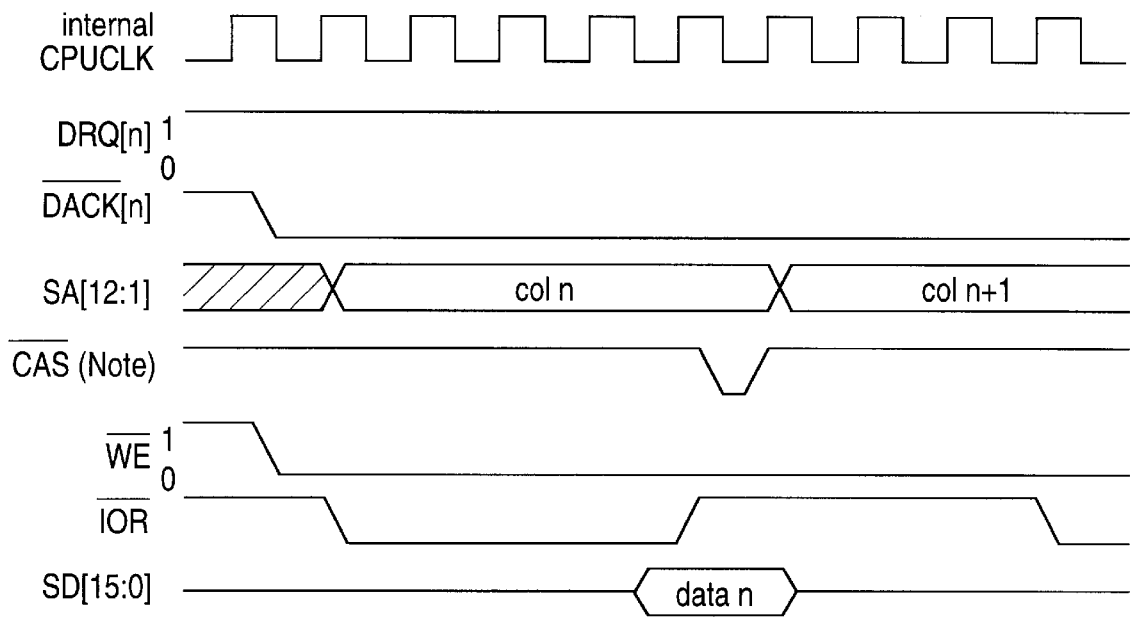
Figure 27:
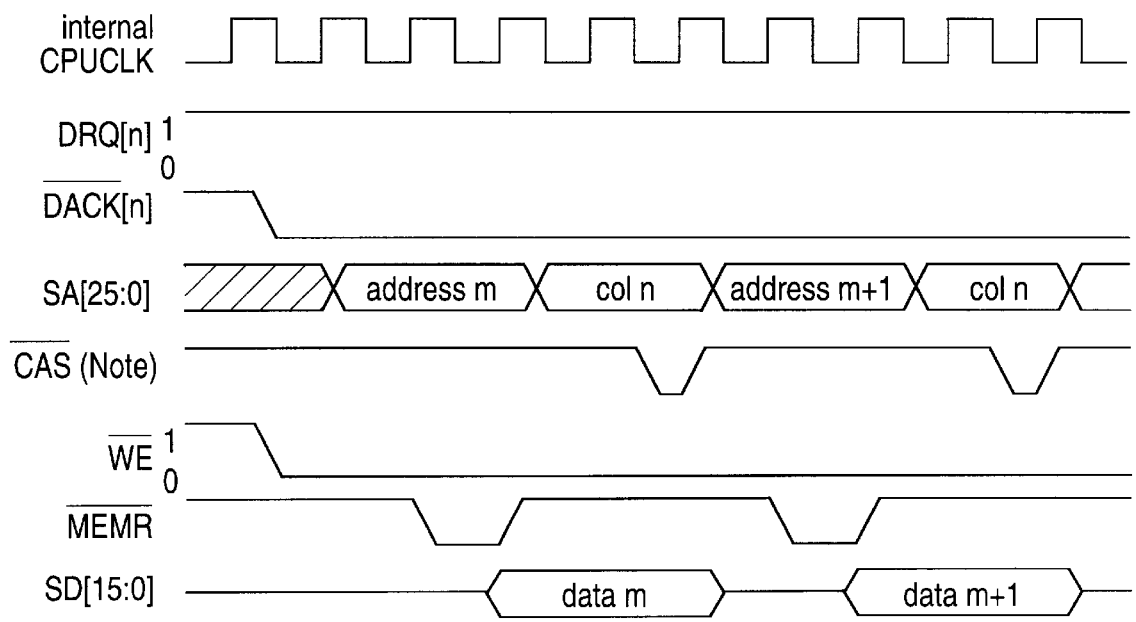
Figure 28:
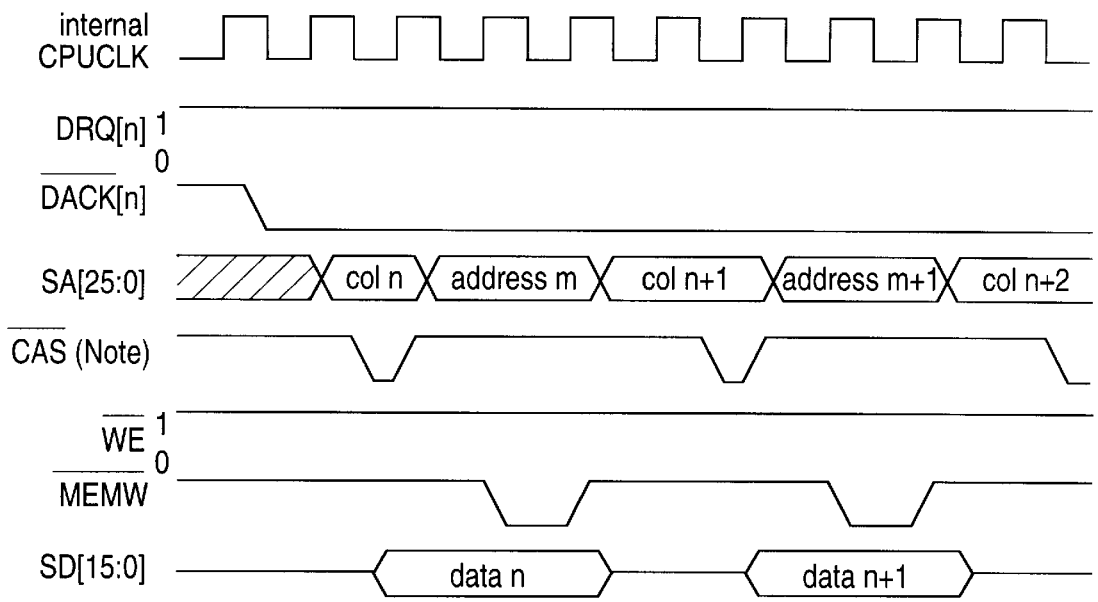
Figure 29:
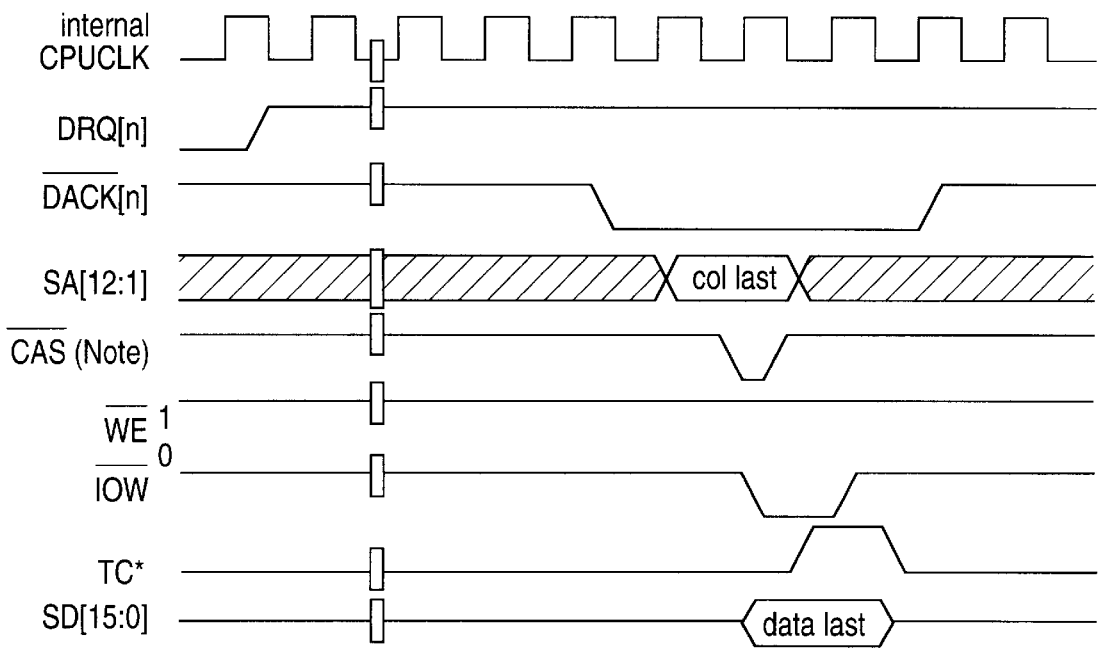
Figure 30:
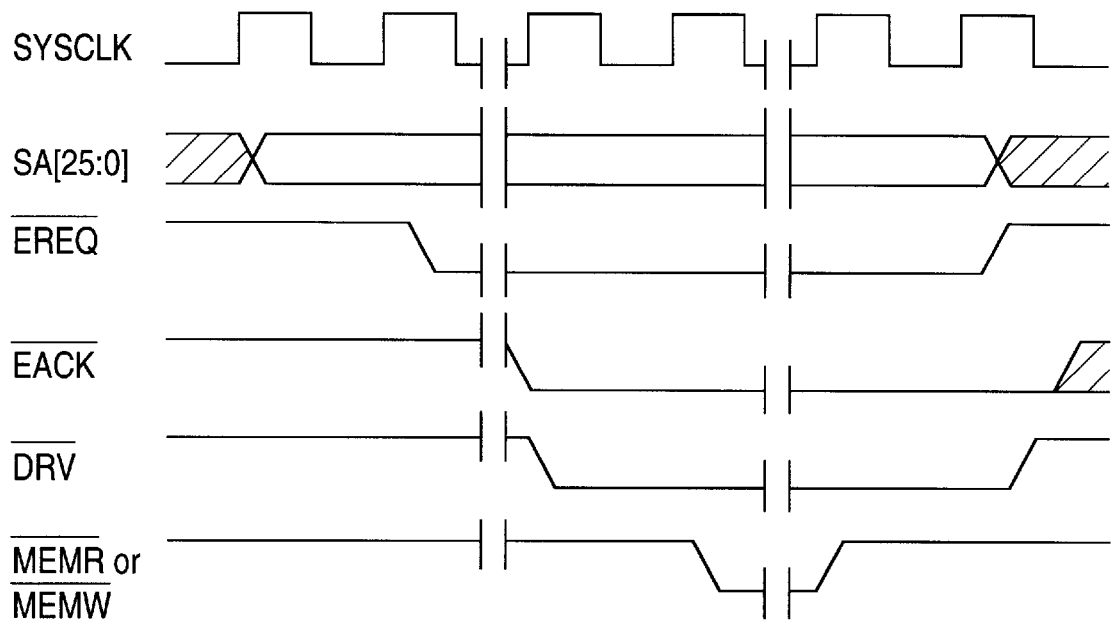

With respect to the programmable wait state, referring to FIG. 19, in hardware, there are three DFBB (D flip-flop with both clear and pre-set function), one decrement to generate a "Wait" signal for the state machine. By using clear and pre-set functions in the D flip-flop, the data mode register bit[5:3] (wait number) are loaded to these three DFFBs. In the state machine wait state, the wait number (if not zero) will be decremented by one on every clock (CLK_BUF) rising edge until it rolls to zero, then the signal "Wait" will be zero too. The wait number will be reloaded and ready to use in next wait state.

In the state machine, if the "Wait" is not equal to zero, the state machine will go to the wait state until the "Wait" rolls to zero and the slave is ready or the DRAM is ready active. At this wait state, the I/O read/write strobe will stay active low. The longer the wait state stays, the longer their strobe stays. Some slow devices may need several clocks before they can generate an active slave ready signal.

Figure 10:
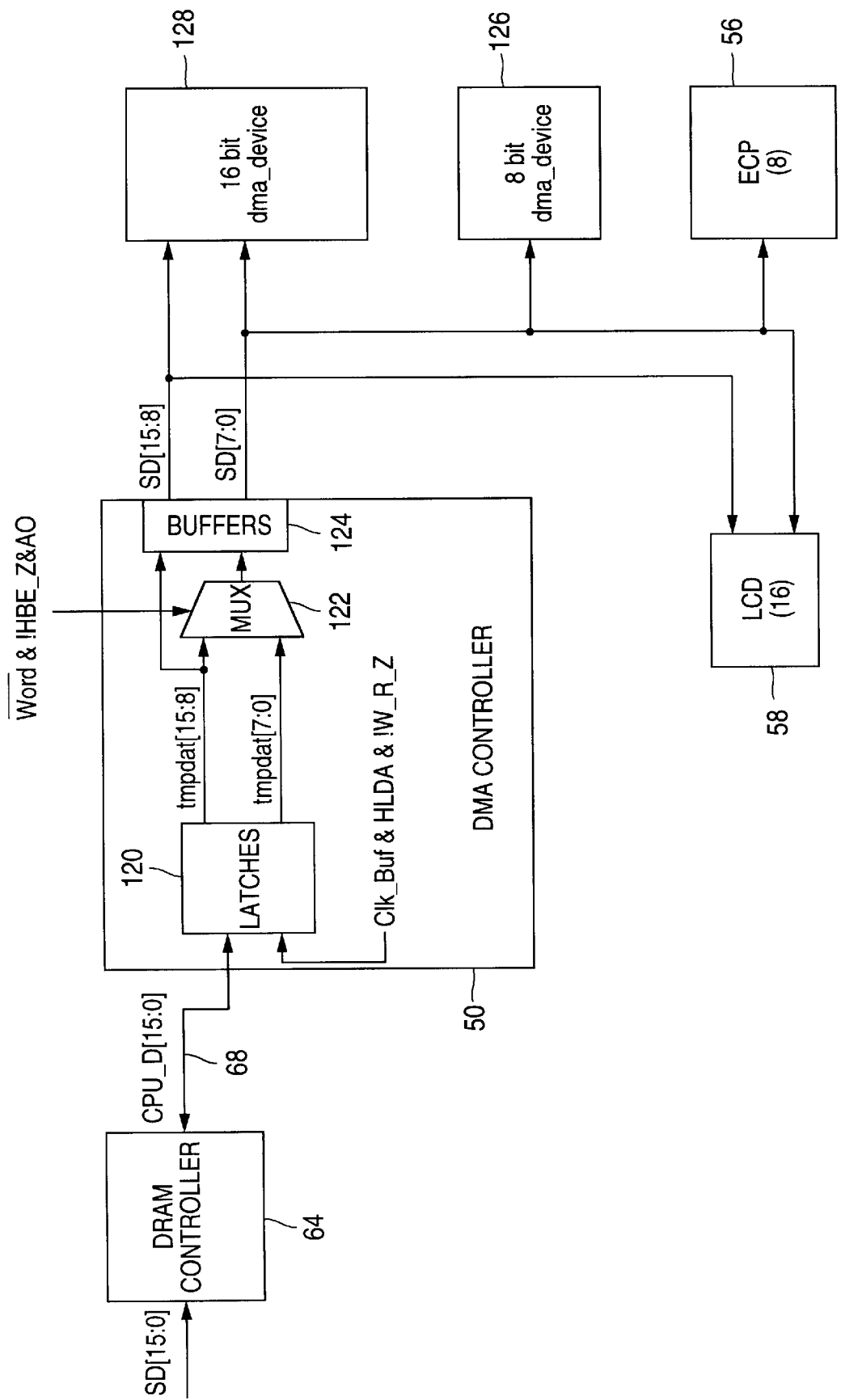
FIG. 10 is a block diagram illustrating a portion of the DMA controller shown in FIG. 4 which generates 8 and 16 bit wide busses.

Bit [2] of the data mode registers 92 sets the requester bus size; specifically, 0 for 8-bit data transfer and 1 for 16-bit data transfer. Referring to FIG. 10, the DMA controller 50 byte alignment supports both 16 bit and 8 bit devices in the DMA device write cycle. Specifically, the DRAM controller 64 sends the CPU data CPU_D[15:0] data latches and byte alignment block 120. The a data latches and byte alignment block 120 latches the data CPU_D[15:0] and then splits it into two 8 bit wide buses tmpdat[15:8] and tmpdat[7:0]. The two buses tmpdat[15:8] and trnpdat[7:0] are then multiplexed in a multiplexer 122 with the result being sent to a set of buffers 124. In addition, the tmpdat[15:8] bus is sent directly to the buffers 124.

The buffers 124 have two output busses: SD[15:8] and SD[7:0]. Eight bit devices, such as the ECP port 56 and the dma device 126, receive only the data bus SD[7:0]. Sixteen bit devices, such as the LCD controller 58 and the dma device 128, receive both data buses SD[7:0] and SD[15:8].

With respect to the 8/16 bit bus feature, since the system memory bus is a 16 bit data bus, a 16 bit DMA device can connect directly to SD_IN[15:0] (or SD_OUT[15:0]) or D_BIU[15:0]. No byte alignment is needed for those devices.

For 8 bit devices, in a DMA write cycle, the high byte system memory read data will be sent on CPU_D[15:8], but 8 bit devices do not have data lines to connect to the high byte. So byte alignment is necessary for those devices. If "word" is low, which indicates an 8 bit device, and DMA_BEE_Z is low which indicates a high byte access, latched tmpdat high byte will send to the low byte data bus (SD_OUT[7:0] or D_BIU[7:0]) through the multiplexer 122, then the next cycle 8 bit DMA device should be able to write them.

For an 8 bit device DMA read cycle, high byte data will be in the low byte data bus SD_IN[7:0] or D_BIU[7:0]. The data will be latched and the low byte will put to high byte CPU_D[15:8] if "word" is low and DMA_BEE_Z is low, then in the next system memory write cycle, the system memory high byte will get correct data.

Bits [1:0] of the data mode registers 92 select the channel to be programmed according to the following table:

| Bits | Channel |
| --- | --- |
| 00 | channel 4 |
| 01 | channel 5 |
| 10 | channel 6 |
| 11 | reserved |

A second data mode register 92 is also a write only register and sets up the data timing and width parameters for DMA channels 4–6. The I/O map address of this register is 00DBh. Bits [7:2] provide the same function as bits [7:2] of the first data mode register. Bits [1:0] select the channel to be programmed according to the following table:

| Bits | Channel |
|------|---------|
| 00 | channel 4 |
| 01 | channel 5 |
| 10 | channel 6 |
| 11 | reserved |

A mask register 94 enables or disables the individual channels. The command register 88 holds the global enable/disable bit. Specifically, each channel has an associated mask bit that can be set to disable the incoming DRQ. If the channel is not programmed for autoinitialize, each mask bit is set when its associated channel produces a terminal count (TC) or received an end of process (schematic $\overline{EOP}$). Each bit of the mask register may be set or cleared separately under software control. The entire register is set to ones by a reset. This disables all DMA requests until a clear mask register instruction allows them to occur. This register may be read or written and has an I/O map address of 000Fh. Bit [7] of the mask register 94 is reserved. Bit [6] is the channel 6 mask bit; a 0 enables channel 6, and a 1 disables channel 6. Similarly, bits [5:0] are the channel 5 down to channel 0 mask bits, respectively. A 0 enables each channel, and a 1 disables each channel.

The terminal count (TC) status register 96 flags when a channel has reached the terminal count. The terminal count (TC) status register 96 is read-only and indicates which channels have reached a terminal count. When a channel reaches its terminal count, or an external $\overline{EOP}$ associated with that channel is produced, that channel's terminal count bit is set to a one. These bits are cleared to zeros upon reset and upon a master-clear. This register shares I/O map address location 0008h with the command register 88 (a write-only register). Bit [7] of the TC status register is reserved. When bit [6] is a 1, channel 6 is at terminal count. Similarly, when bits [5:0] are each a 1, channel 5 down to channel 0 are at terminal count, respectively.

A request status register flags which channels have pending DMA requests. The request status register is read-only. These bits are set to one when their corresponding channel is requesting service and are cleared to zeros upon reset and upon master-clear. Bit [7] of the request status register is reserved. When bit [6] is a 1, channel 6 has a pending DMA request. Similarly, a 1 in bits [5:0] indicates that channels 5 to 0 have pending DMA requests, respectively.

The buffer chaining mode registers 98 control the chaining mode of the DMA transfer. Setting up the chain registers allows a single DMA arbitration cycle to support a series of reads and writes. Specifically, buffer chaining is a method of efficiently transferring data by enabling source/destination register updating simultaneously with data transfers. In this mode, the DMA controller 50 allows the CPU 54 to write new base register information to the DMA controller 50 while the old base/current target address registers 76 and 78 are being used to move data.

This is accomplished by programming the DMA controller 50 to interrupt the CPU 54 for more programming information while the previously programmed transfer is still in progress. In chain mode, the DMA controller 50 loads the new transfer information automatically when the first transfer completes. In this way, the entire transfer can be completed without interrupting the operation of the DMA device. This mode is most useful for single cycle or demand modes of the controller where the transfer process allows time for the CPU 54 to execute the DMA interrupt routine.

Figure 11:
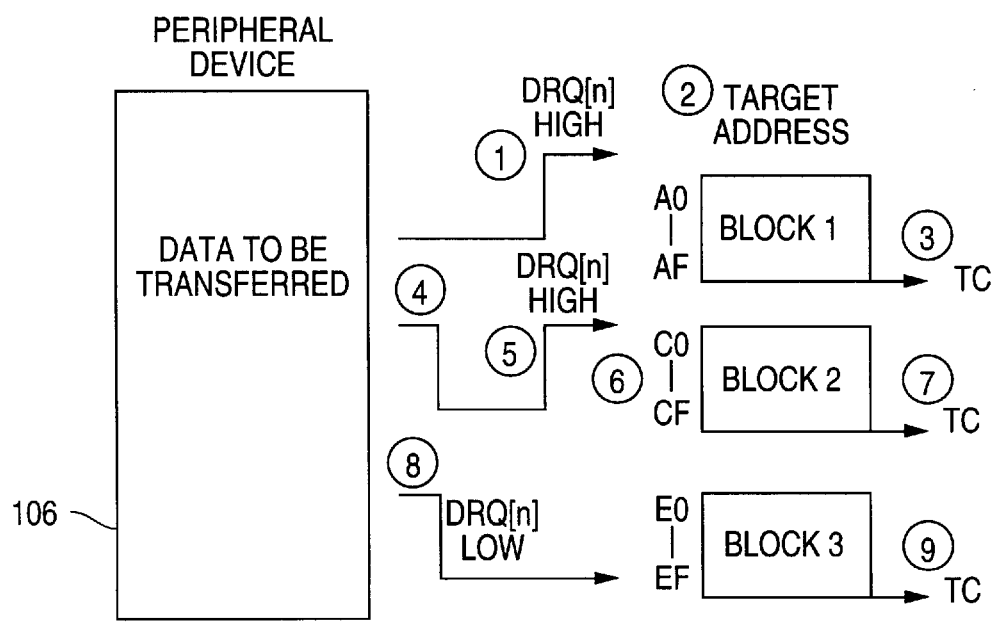
FIG. 11 is a block diagram illustrating a buffer chaining mode performed by the DMA controller shown in FIG. 4.

The example shown in FIG. 11 illustrates the sequence of a chain operation. In this example, a block of data 106 is to be transferred to three discrete locations starting at A0h, C0h and E0h. Before starting, it is understood that user software has programmed the DMA controller 50 to be in chain mode, that it is enabled, and that CPU interrupt routines exist to handle the requirements of the chain operation.

Initially, the DRQ[n] signal is low, indicating no request is being made. In order to start, the peripheral asserts its DRQ[n] DMA request signal high. This starts a DMA arbitration sequence. If the DMA channel wins the arbitration, the following sequence begins. The CPU 54 has programmed the DMA controller 50 with the initial values of base target address register 76 (A0h), base requestor address register 80 (needed in memory-to-memory transfers only), and the base count register 84. These values are automatically and immediately transferred from the base registers to the current registers. The user software then sets the chain mode bits, enabling chain mode operation. Then the user software loads the DMA controller base registers with the values for the second transfer (C0h). Because the chain bits are set, these values will not be immediately transferred into the current registers. The DMA controller 50 begins the transfer of data using the address pointed to in the current address registers.

Only after the terminal count is reached for the first transfer, will the DMA controller 50 automatically transfer the second set of base register values (C0h) into the current registers. It will then set the appropriate bits in the chaining base empty status register to indicate that the base registers are now empty and ready to be updated. The DMA controller 50 will then also assert an internal interrupt request to the CPU 54 for DMA chaining mode. This pending interrupt request indicates to the CPU 54 that the DMA controller 50 is in chain mode and that the base registers are ready to be refilled with the next target address. While this CPU 54 activity is occurring, the DMA controller 50 is continuing with the second data transfer.

In order for the CPU 54 to regain control of the bus and thus be able to recognize the pending interrupt, DRQ[n] must be deasserted before the second TC occurs. To continue the DMA chain transfer, the DRQ[n] must be reasserted. In the interrupt routine, the CPU 54 loads new values into the base registers (E0h), sets the chain mode enabled bits, and clears the chaining base empty status bits. This routine must be completed before the second TC is reached.

After the second TC is reached, the DMA controller 50 again automatically transfers the third set of base register values (E0h) into the current registers. In the interrupt routine triggered by the first TC, the user software realizes that the chain mode transfer is almost finished (no further chaining action is required) and so the user software sets the chain mode disabled bits. Again, this routine must be completed BEFORE the second TC is reached. Because the third (and final) set of addresses are already in place in the DMA controller 50, there is no further need to assert any additional DRQ[n] signals. When the third TC is reached, because the chain mode bits are disabled, the DMA transfer is over.

A channel is initialized for buffer chaining by programming the DMA base register with the appropriate initial values, then programming the chaining mode register 98 to enable chaining mode (Chaining register, bits [4:3]=01). The base registers must then be programmed with the appropriate address/byte count values for the next DMA transfer. When the current byte (or word) count register reaches terminal count, the DMA controller 50 loads the current registers from the base register, sets the appropriate bit in the chaining base empty status register and asserts an internal interrupt request for DMA chaining mode. This pending interrupt request indicates that the base registers are empty and chaining mode is enabled.

The base register must be updated and the chaining register must be set to "base register update complete" (chaining register bits [3:2]=11) before the current byte count register reaches zero, or the DMA controller 50 will terminate the data transfer by setting the channel's bit in the channel base empty register, and setting the channel's mask bit in the mask register. Note that setting bits [3:2]=11 in the chaining register also automatically clears the bits in the chaining base empty status register.

The DMA controller 50 asserts its internal interrupt request only after reaching a terminal count or receiving an external $\overline{EOP}$ (with chaining mode enabled). It does not assert the internal interrupt request during the initial programming sequence that loads the DMA base register twice. The interrupt handler up-dates the channel's base registers, then programs the chaining mode register with "base register update complete" (chaining register bits [3:2]=11).

When chaining mode is enabled, only the base registers are loaded by the user software. The current registers load automatically after the current byte count register reaches terminate count. The processor can read the current registers, but not load them.

The base empty bit for each DMA channel (refer to the chaining base empty status register on next page) is cleared whenever its a "base register update complete" is performed (writing 11 into bits [3:2] of the chaining register). On the other hand, a DMA channel's base empty bit is set to a 1 whenever it reaches a terminal count (TC) or receives an end of process ($\overline{EOP}$) signal.

The chaining mode registers 98 are write-only registers which allow the enabling or disabling of chaining mode on a per channel basis. The first register controls channels 0–3 and has an I/O map address of 00DAh. This register also provides a means to indicate that the base registers have been updated. Following a reset all bits that are programmable via this register will be zeros. Bits [7:4] are reserved. Bits [3:2] are the chaining mode enable bits; specifically, 00 disables chaining mode (default value), 01 enables chaining mode, 10 is reserved, and 11 indicates that base register update is complete (set by interrupt routine, also clears chaining base empty status register bits associated with the selected channel). Bits [1:0] are the channel select bits; specifically, 00 selects channel 0, 01 selects channel 1, 10 selects channel 2, and 11 selects channel 3.

A second chaining mode register 98 controls channels 4–6 and has an I/O map address of 00DDh. Bits [7:2] have the same function as bits [7:2] of the first chaining mode register. Bits [1:0] are the channel select bits; specifically, 00 selects channel 4, 01 selects channel 5, 10 selects channel 6, and 11 is reserved.

A chaining base empty status register is a read-only status register that indicates which (if any) of the channel's base registers are empty. It has an I/O map address of 00DFh. This register only has meaning for channels which are programmed for chaining. Following a reset or master clear all bits in this register are zeros. The bits are set to one every time the chain bit is set and the base register value is loaded into the current address register. It indicates that the base is available to be reprogrammed with the next value. These bits are automatically cleared when the values 11 are written into bits [3:2] of the chaining register 98 (indicating that the base values have been successfully rewritten by the CPU interrupt program). Bit [7] is reserved. Bit 6 indicates that channel 6's base is empty. Similarly, bits [5:0] indicate that channels' 5 to 0 bases are empty, respectively.

The chaining mode channel status register is a read-only status register that indicates which (if any) of the channels are programmed to be in chaining mode. Following a reset or master Clear all bits in this register are zeros. It has an I/O map address of 00DEh. Bit [7] is reserved. Bit [6] indicates that channel 6 is in chaining mode. Bits [5:0] indicate that channels 5 to 0 are in chaining mode, respectively.

With respect to the chaining mode, when a terminate count (TC) is reached or an EOP is received, even though the channel is not programmed to autoinitialization, if "base register updated" flag is set the state machine will go to TAUTO (autoinitial state) to load the base address and the base count register to the current address and current count. The state machine then goes back to the active transfer state again to continue transfer while in the other mode it usually goes to the exit state after it goes through TAUTO.

A write-only master clear register acts as a master disable location. The master clear instruction clears the command 88 and status registers and sets the mask register 94 to disable DMA requests. Any operation in progress is aborted. It has an I/O map address of 000Dh.

A write-only clear mask register acts as a quick channel enable. The clear mask register command enables all DMA channels by clearing the mask bits. It has an I/O map address of 000Eh.

Finally, two DMA configuration registers, internal DMA request selection and CPU DMA request register, configure the generation of DRQ signals. During a system reset the bits in the internal DMA request selection register are set to 00h. This 6-bit register is a read/write register and is located at I/O map address EFE0h. This register determines what internal function, if any, is connected to the internal DMA channels 1, 3 and 5. Bits [7:6] are reserved. Bits [5:4], i.e., DSR5_1-DSR5_0, are bits [1:0] of the internal DMA selection for channel 5. These two bits determine the internal device connected to internal channel 5 of the DMA controller 50 as follows:

| DSC5_1 | DSC5_0 | Function |
|---|---|---|
| 0 | X | None |
| 1 | 0 | ECP |
| 1 | 1 | LCD |

Bit [3:2], i.e., DSR3_1-DSR3_0, are bits [1:0] of the internal DMA selection for channel 3. These two bits determine the internal device connected to internal channel 3 of the DMA controller 50 as follows:

| DSC3_1 | DSC3_0 | Function |
|---|---|---|
| 0 | 0 | None |
| 0 | 1 | PCMCIA |
| 1 | 0 | ECP |
| 1 | 1 | LCD |

Bits [1:0], i.e., DSR1_1-DSR1_0, are bits [1:0] of the internal DMA selection for channel 1. These two bits determine the internal device connected to internal channel 1 of the DMA controller 50 as follows:

| DSC1_1 | DSC1_0 | Function |
|---|---|---|
| 0 | X | None |
| 1 | 0 | ECP |
| 1 | 1 | LCD |

During a system reset the bits in the CPU DMA request register are set to 00h. This 7-bit register is a read/write register and is located at I/O map address EFE1h. Writing a 1 into a bit in this register will result in generating a DMA request on the associated internal DMA request signal (internal_DRQ). In this manner a DMA request may be made via software without any additional external hardware. Transfers with auxiliary processors and shared memory are also supported via this requesting technique. The DMA channel must be unmasked for this register to cause a DMA request to occur. Bit [7] is reserved. Bit [6:0], i.e., C_DRQ6–C_DRQ0, are the CPU DMA Requests 6–0. When a one is written to these bits, the corresponding internal DMA request signals (internal_DRQ6–0) will become active high. When these bits contain zeros, the corresponding internal_DRQs will be driven by their selected source.

The DMA controlled shared memory transfer is very similar to the CPU controlled transfer except for three differences: First, the DMA controller 50 may retain control over the shared memory to allow large blocks of data to be transferred at a time. Second, the initiation of the DMA controlled shared memory block transfer must be a DMA Request. That requires either the external master controller to make a DMA request, or the CPU 54 can make a DMA request via the CPU DMA request register. If the request is made via the CPU DMA Request Register, the entire block transfer will be performed before control is returned to the CPU 54. Lastly, after the last transfer more than one CPU-CLK period may pass before $\overline{EREQ}$ is deasserted.

During a system reset the bits in an external master chip select selection register are set to 00h. This 8-bit register is located at I/O map address EF56h. Writing a 1 into a bit in this register indicates that the corresponding logical chip select decodes a external master shared memory range. When an access is made to that external master shared memory range the bus interface unit will perform the arbitration for the external master shared memory and perform the appropriate bus cycle. Bits [7:0], i.e., EM_L8–EM_L1, are the external master logical chip select 8—1. When a 1 is written into a bit in this register, it indicates that the corresponding logical chip select decodes an external master shared memory range.

Figure 12:
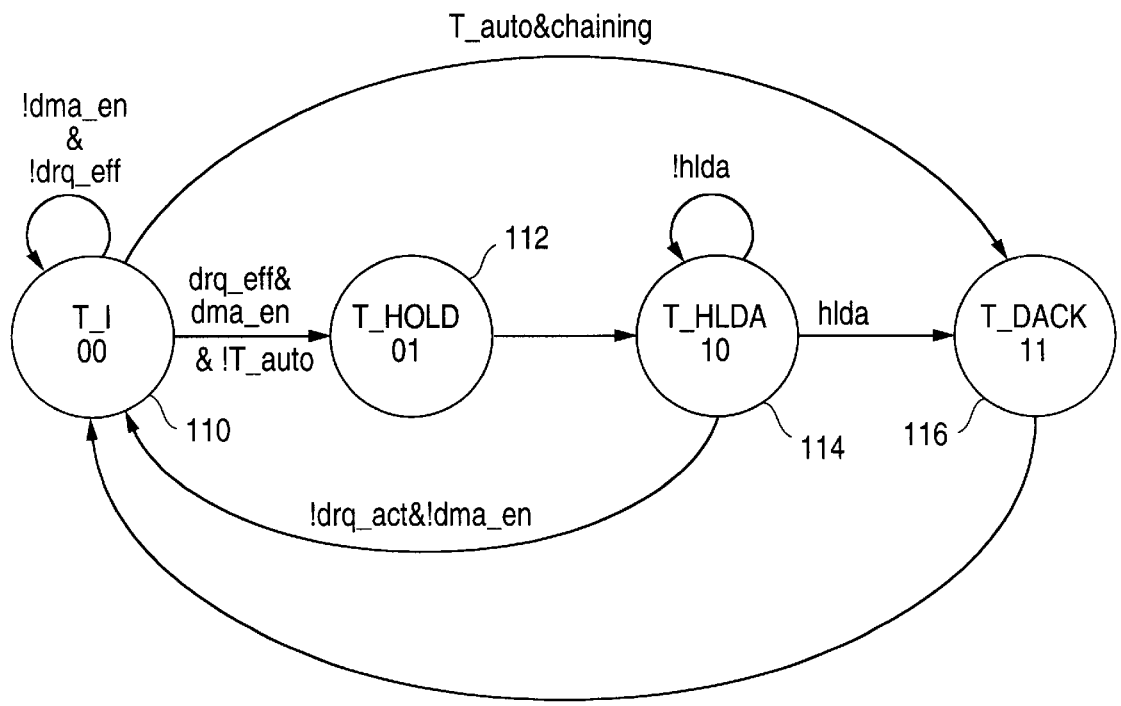
FIGS. 12–18 are state diagrams illustrating the operation of the DMA state machine and timing control logic shown in FIG. 4.

During operation, the DMA controller 50 is designed to request bus control from the CPU 54, synchronize its accesses to memory and I/O with the BIU 62 and to transfer data to and from memory locations and I/O addresses. FIGS. 12–18 illustrate the sequences performed by the DMA state machine 108. Specifically, FIG. 12 illustrates the DMA controller 50 in its initial state. Initially, the DMA controller 50 sits in an idle state 110 and waits for one or more peripherals to request a DMA transfer using the data request DRQ[n] signals. Once a data request DRQ[n] signal is received, an arbitration sequence is started where the highest priority requester (according to a preset priority) will get (win) the first DMA service. In the next state 112, the DMA controller 50 requests control of the CPU local bus 68 using the HLD (i.e., hold) signal to the CPU 54. The DMA controller 50 then sits in a wait state 114 until the CPU 54 finishes its current cycle. When the CPU 54 finishes its current cycle, it relinquishes the address, data and control buses and signals the DMA controller 50 via the HLDA signal. It should be noted that in a LOCK cycle, the CPU 54 will completely finish the LOCK cycle first. In the next state 116, the DMA controller 50 takes control of the CPU local bus 68, and sends a data acknowledge $\overline{DACK}[n]$ signal to the requester that won the arbitration. In buffer chaining mode the DMA controller 50 bypasses the HOLD and HLDA signals and jumps directly to the acknowledge state 116.

After the data acknowledge $\overline{DACK}[n]$ signal has been sent, the DMA controller 50 reads data from the DMA device, which can be either I/O or memory mapped, and then writes to the system memory 66, or vice versa. It then automatically increments or decrements the system memory 66 or DMA device addresses, and decrements the byte count register.

Figure 13:
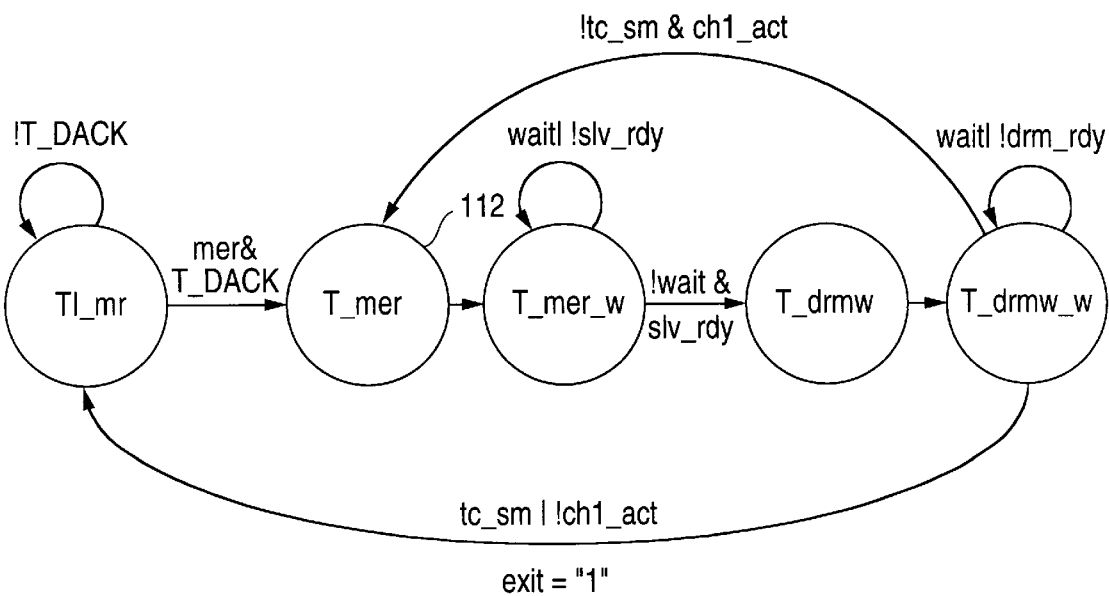

FIG. 13 illustrates the sequence of a memory device read operation. During this operation the DMA controller 50 reads data from the requesting memory device and then writes the data to the system memory 66.

Figure 14:
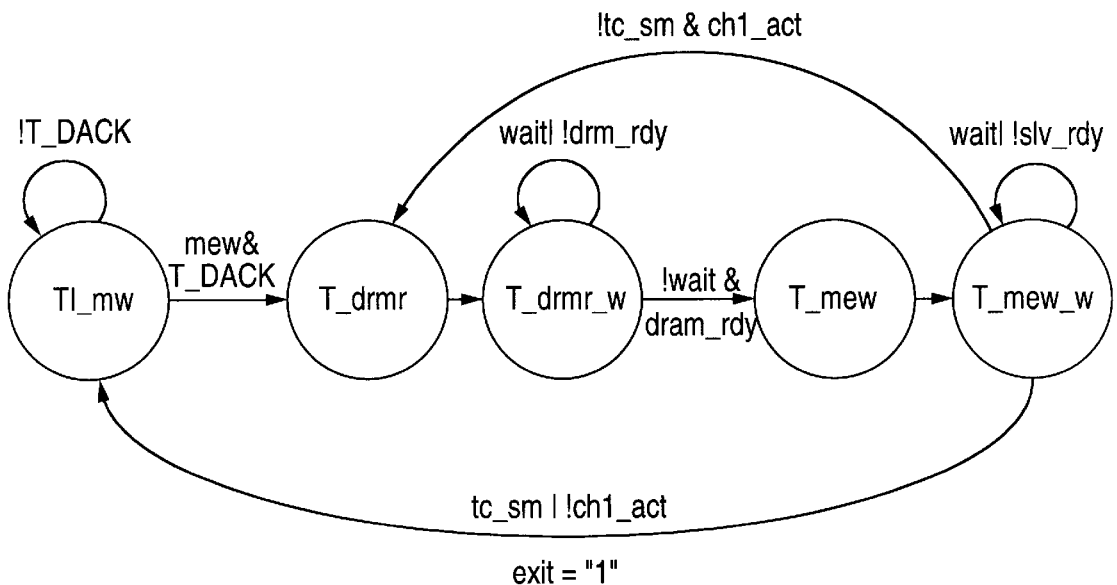

FIG. 14 illustrates the sequence of a memory device write operation. During this operation the DMA controller 50 reads data from the system memory 66 and writes that data to the requesting memory device.

Figure 15:
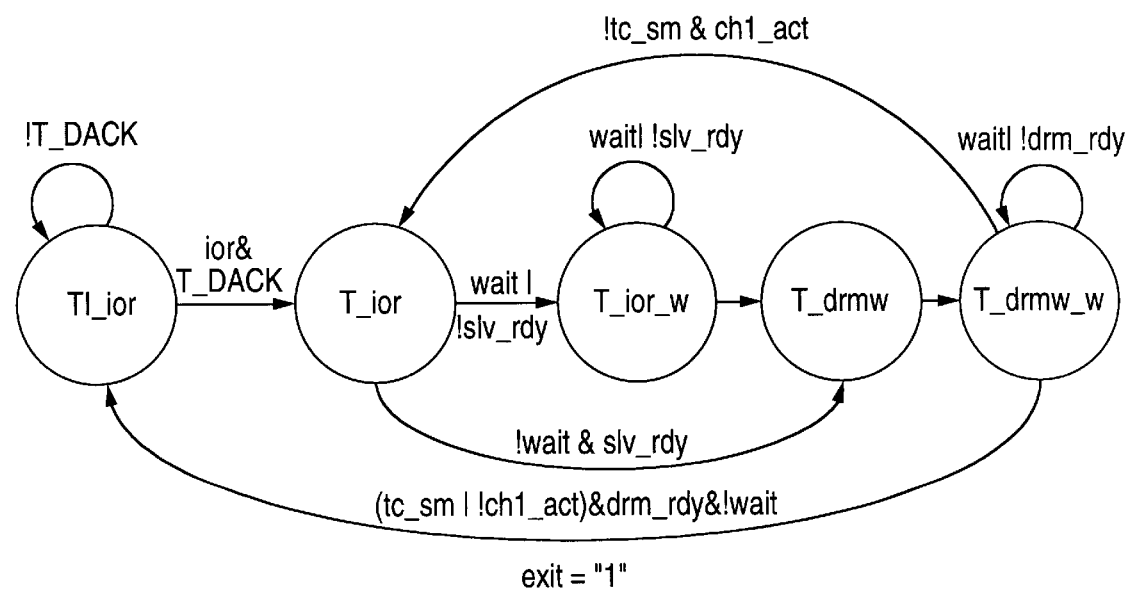

FIG. 15 illustrates the sequence of an I/O device read operation. During this operation the DMA controller 50 reads data from the requesting I/O device and then writes the data to the system memory 66.

Figure 16:
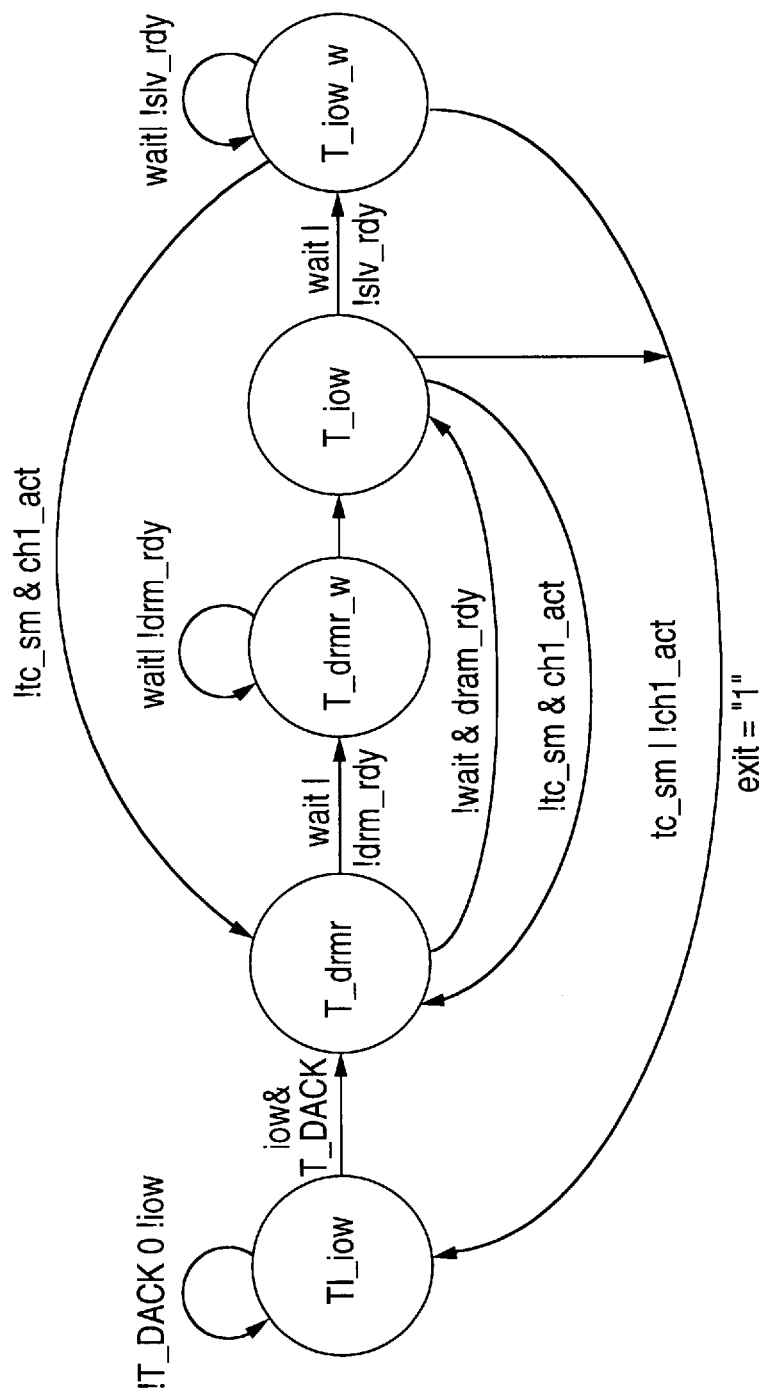

FIG. 16 illustrates the sequence of an I/O device write operation. During this operation the DMA controller 50 reads data from the system memory 66 and writes that data to the requesting I/O device.

Figure 17:
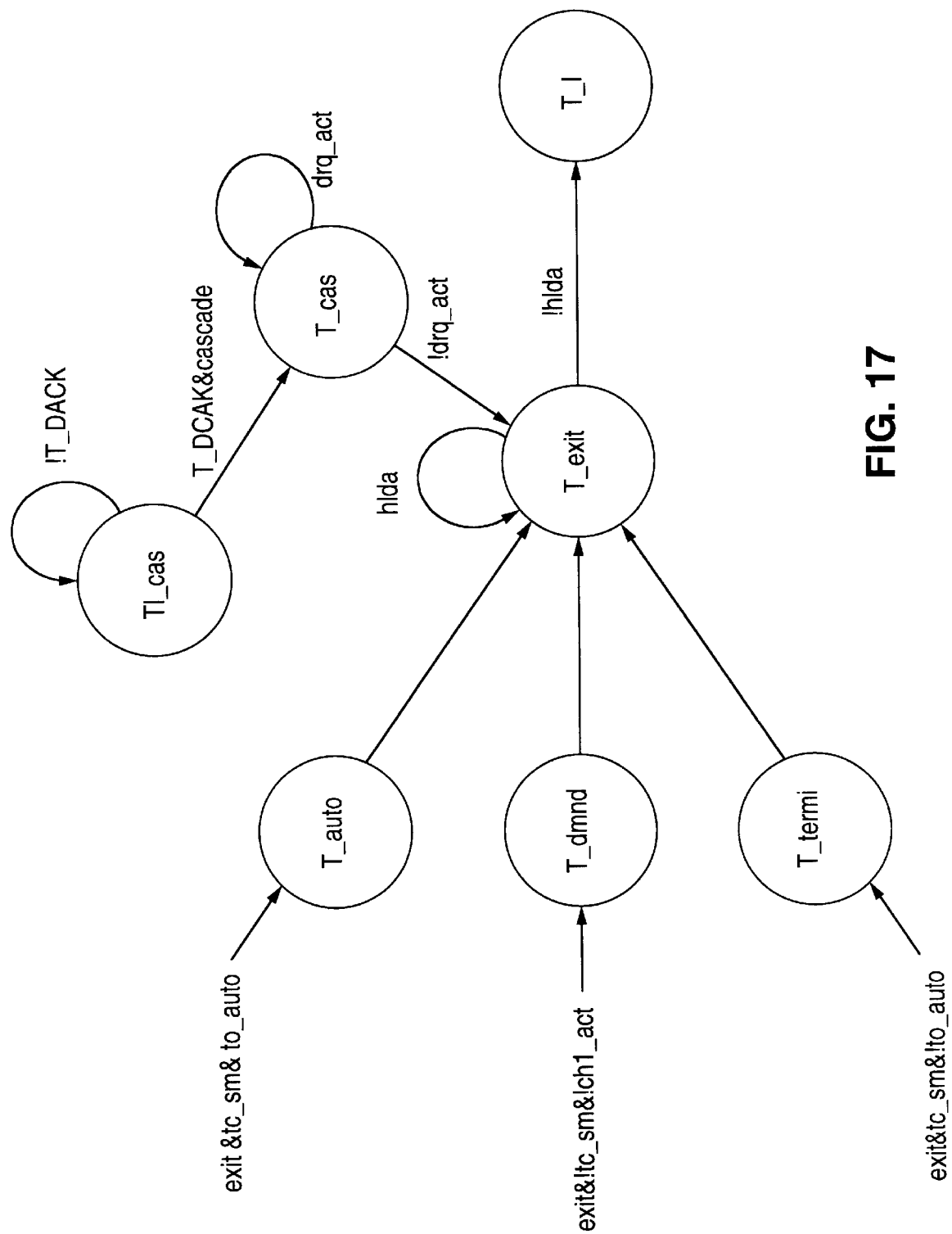
Figure 18:
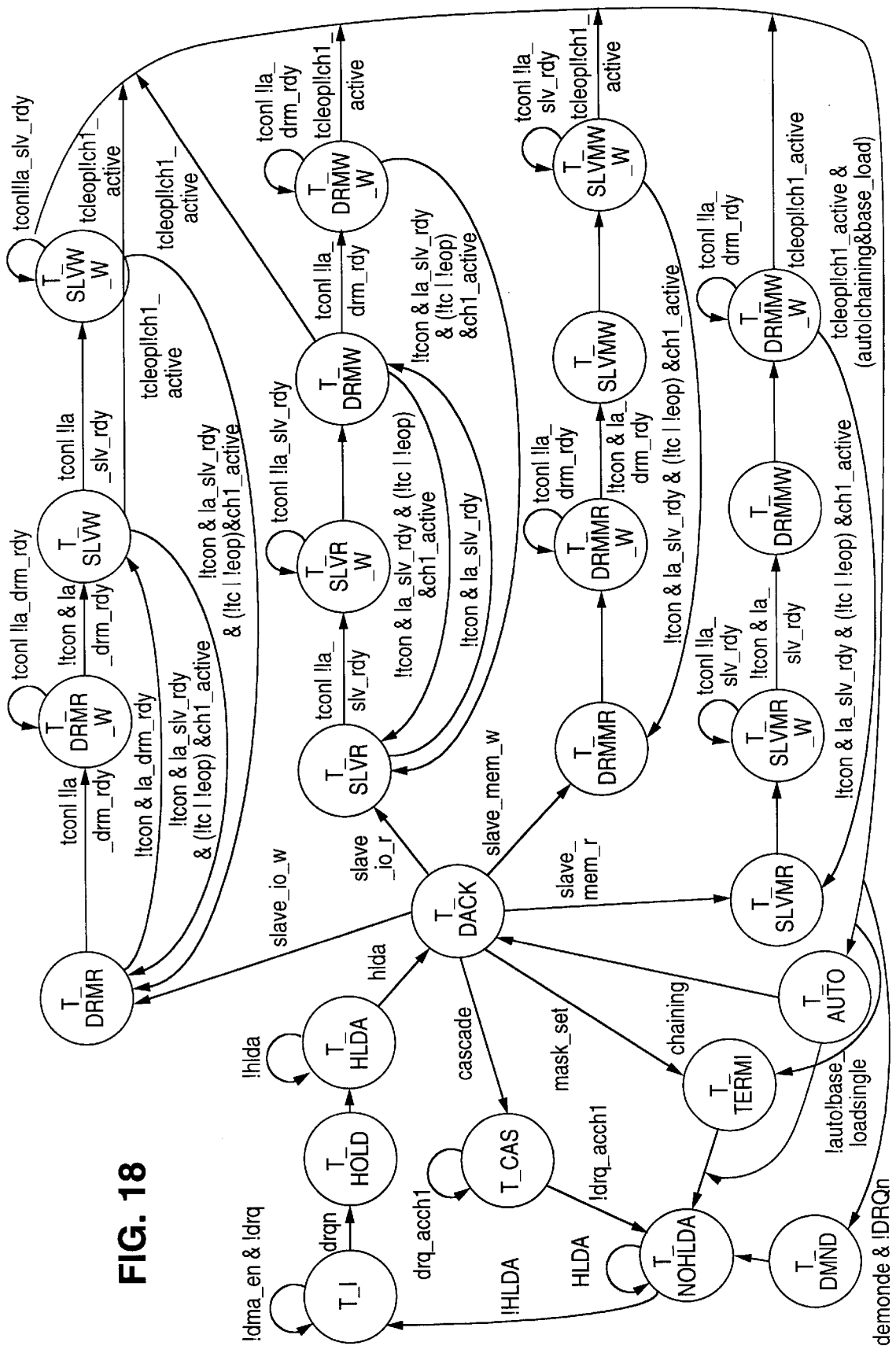

FIG. 17 illustrates the exit state of the DMA controller 50. The DMA transfer ends in one of several ways. In single mode, it ends after a single byte or word is transferred. In demand mode, it can end when the winning DMA channel's DRQ signal goes low (inactive). Or, in block and demand modes, it ends when a terminal count (TC) is recorded (when the byte count equals the number of bytes to be transferred), or an EOP (end of process) signal is received.

The following is an explanation of the DMA Modules. 1) dma_sm: DMA state machine encode by "one-hot" code. Input asynchronous signals (DRQ, SLV_RDY) are synchronized by CPU_CLK. DRAM_RDY is latched at the proper state. Most flags (TC, CHAINIG1, ATUO, etc.) are all associated with the active channel (winning channel through priority resolver). 2) dma_sm_decode: Decode DMA states. It also generates signals associated with these states. Some are not timing critical and are decoded from the current state. Those that are timing critical are decoded from the previous state. 3) dma_smcnt1: This generates the DMA command signals (dma_sio_r_z, dma_bhe_z, etc.) and the DMA wait states. 4) dma_resolver: This resolver dma priority. It starts work when the DMA detec DRQ and dma is enabled. It stops the priority resolver after receiving CPU-HLDA and sending out DACK_Z for winning channel. 5) dma_bcreg: This generates dma base/current byte count register read/write strobes. It programs the base/current registers. It decrements the active channel current byte count register for every data transfer. 6) dma_comreg: This programs the command register. It generates the "priority" and "DMA_ENABLE" signals. 7) dma_datch1: This signal programs the dma "Data Mode Register" and the "Channel Mode Register" for all channels. It decodes those registers and bits and generates all of the channel status (address increment/decrement, wait state number, io/memory, read/write, auto-init enable/disable, 8 bits/16 bits, etc.) for the active channel. 8) dma_chaining: It programs the chaining mode register and generates the chaining status register "base_empty." When TC (or EOP) is set, it goes to TAUTO to load all the base registers to current registers if active channel "base_updated" flag is set and it continues transfer. After TAUTO, the "base_empty" will be set. By the time the interrupt service routine is finished re-programming the base register, the "base_updated" flag set by this service routine will clear the "base empty" status register active channel bit. 9) dma_tmpdat:

This signal latches or drives the data bus. The CPU data will be clocked in the tmpdat register at the rising edge DMA__CA__BUF, and the proper byte alignment will be done in the device is 8 bits . The tmpdat registers will drive the SD bus and Data bus at the I/O write cycle and stay stable when the I/O write strobe is low. It will hold another half clock cycle after the I/O write strobe goes inactive. In the read cycle, the D data bus (for the internal channels) or the SD data bus (for the external channels) will be clocked in the tmpdat registers at the rising edge of the read strobe and drive to the CPU data bus after the proper byte aliment is done. The signal CPU__D will remain stable until the signal DMA__CAS__BUF is high.

10) dma__tar__reg: This signal writes the dma target (dram) base/current address. It also increments/decrements the address by one or by two depending on the byte or word transfer at the rising edge of DMA__CAS__BUF. 11) dma__tar__out: This signal handles the address register read. It takes read strobes and BHE__Z and AO to put the correct byte/word address register in the data bus. 12) dma__tar__decode: This signal decodes CA__DMA, address, BHE__Z and AO to generate the proper strobes for each register read/write. 13) dma__tar__top: This signal extantiates three modules: dma__tar__decode, dma__tar__reg and dma__tar__out. 14) dma__rq__reg: This signal writes dma requestor (device) address register (for memory to memory transfer). It also increments/decrements by one or two, depending on an 8 bit or 16 bit device, at the rising edge of the dma memory read/write strobe. 15) dma__rq__out: This signal handles the address register read. It takes the read strobes and BHE__Z and AO to put the correct byte/word address register in the data bus. 16) dma__rq__top: This signal extantiates two modules: dma__rq__reg and dma__rq__out. 17) dma__tcmskstt: This signal generates the status register and mask register. Every time the TC (or EOP) signal goes high, the associated active channel status bit will set. It is cleared by reset and the master__clear command. The mask register bits can be programmed to "1" or "0", and can be set by the reset and "master__clear" instruction. The mask register bits can be cleared by "clear all mask" instruction and also can be set when TC (or EOP) is high. But the channel is not programmed to auto-initialize. It can be set in chaining mode when TC (or EOP) high and the ase__updated flag is not set. Both status and mask register are readable. 18) dma__inbuf: It handles the extantiate buffers for all of the input signals and also common clock tree. 19) dma__otubuf: It handles extantiate buffers or tri-state buffers for dma output signals. 20) dma-cntl: It is a top module for extatiating all modules discribed above.

The DMA controller 50 contains 20 modules. The modules functions are as follows. 1) dma__sm: This modules generates the dma state machine. All asynchronous signals (DRQ, slv__rdy) that come to the state machine are synchronized to CLK__BUF. All states are "one-hot" coded. The state machine contains the following 25 states. 1) T__I(idle state). Default and reset state. 2) T__HOLD: After receiving DRQ and DMA is enabled, it will go to the dma hold state from T__I. It waits in this state until the CPU hold acknowledge comes active. Action: 1) CPU__HOLD will be generated by the dma__smcntl module. 2) The DMA resolver module will do a priority resolve for all requested channels, and any DRQ aboard in this state will participate in the priority resolve. 3) T__HLDA: After receiving CPU__HLDA, it will switch from T__HOLD to T__HLDA. It will unconditional switch to the next state T__DCK. Action: Stop priority resolver, get final winning channel. 4) T__DCK: It will switch to T__CRMR (dram read), T__DRMMR (dram-memory read), T__SLVR (slave read), TSLVMR (slave-memory read) depending on which active channel status will be generated for dma state machine. Action: generate DACK__Z to active channel. All active channel status will be generated for dma state machine. 5) T__DRMR: If the active channel programs as "I/O write", it will switch from T__DCK to this state. If zero wait states are programmed (fly-by) and dram give dram__rdy 10 ns before next CLK, it will switch to T__SLVW (slave write state). If the wait state is not zero or the dram is not able to give the ready signal on time, it will switch to T__DRMR__W (dram read wait state). Action: DMA__ADS__Z generated. Address will increment/decrement at rising edge of DRAM__CAS__BUF. CPU data will be stored in tmpdat(DFFN) at rising edge DMA__CAS__BUF. 6) T__DRMR__W: This state is from T__DRMR when wait state programmed or drain ready not received on time. It will remain on this state until dram ready high. Dram ready latched by dma__sm in case it come before wait state roll to zero. Action: at every rising edge clock, it will decrement wait state number until it become zero. Wait state will reload in slave write cycle. 7) T__SLVW: Slave write state. It has five possible next state (for all write state or write wait state). a) If wait number not zero or slave ready still low, it will go to T__SLVWW (slave write wait state). b) If wait number roll to zero and slave ready high, terminate count (TC)/EOP not high, channel in block mode (or demand mode DRQ still high), it go to T__DRMR. If in single mode, it go to T__DMND. c) If wait number roll to zero and slave ready high, terminate count (TC)/EOP not high, channel in demand mode but DRQ is low. It go to T__DMND. d) If wait number roll to zero and slave ready high, terminate count (TC)/EOP is high, then if it program to auto-initial or in chaining mode "base__updated" flag set, next state will be T__AUTO. e) If wait number roll to zero and slave ready high, terminate count (TC)/EOP is high, then if not program to auto-initial or in chaining mode "base-updated" flag low, next state will be T__TERMI. Action: DMA__SIO__W strobe will go active low. Byte count register will decrement 1 or 2 depending on slave is 8 bits or 16 bits device. BIU data bus or SD bus will be driven by tmpdat [15:0] in this state. 8) T__SLVW__UW: Slave write wait state. It come from T__SLVW. It also have five possible next state, same as above. Action: DMA__SIO__W strobe will still stay active low and DMA continue drive CUI__D and SD. 9) T__SLVR: Slave read state. It from T__DCK when active channel is programmed as "IO read". If zero wait state programmed (fly-by) and slave ready stay high, it will switch to T__DRMW (dram write state). If wait state not zero or dram not be able give ready signal on time, it will switch to T__DRMR__W (dram read wait state). Action: DMA-SIO__R strobe will go active low. 9) T__SLVR__W: Slave read wait state. It will stay in this state until wait state roll to zero and slave ready go high. Action: DMA__SIO__R will remain low in this state. At rising edge of DMA__SIO__R, tmpdat register will latch SD bus (if active channel is external dma device) or D bus (if active channel is internal dma device). 10) T__DRMW: Dram write state. It has five possible next state same as TSLVW only changes slave ready to dram ready. Action: CMA__ADS__Z go active low in this state. Byte count decrement. 11) T__DRMW__W: dram write wait state. It will stay in this state until wait roll to zero and dram ready high. IT also has five possible next state as stated above. Action: At rising edge of DMA__CAS__BUF, CPU data will be clock in tmpdat register and drive to SD bus or D bus at next state. 12) T__SLVMR: Slave memory read state. If channel program to "memory device read" , state will change from T_DCK to here. It will always go to T_SLVMR_W even program zero wait state. This state is for address switch and stable. Action: Address switch to requestor address. 14) T_SLVMR_W: Slave memory read wait state. It will stay here until wait roll to zero and slave ready go high. Action: DMA_SM_R strobe go active low. At rising edge of this strobe, SD bus or D bus will clock to tmpdat register and tmpdat register will drive CPU_D in next dram write cycle. 15) T_DRMMW: Dram write state (in memory to memory cycle). It always go to T_DRMMW_W. Action: Address will switch to dram address. Byte count register decrement. 16) T_DRMMW_W: Dram write wait state. It has five possible next state depending on TC, DRQ, etc. Action: DMA_ADS_Z go active low for one clock. Address is already stable here. 17) T_DRMMR: If channel program to "memory write", state will change form T_DCK to here. Next state will always be T_DRMMR_W. Action: address switch to dram address. 18) T_DRMMR_W: dram write wait state in memory to memory transfer cycle. It will stay in this state until dram ready high and wait number roll to zero. Action: DMA_ADS_Z go active low for first clock. 19) T_SLVMW: Slave write in M-M cycle. Action: address switch to slave device memory address. 20) TSLVMW_W: Slave write wait state. Action: DMA_SM_W strobe go low. tmpdat register will drive data until this cycle finished. Data will continue driven for another half clock for hold time. 21) T_AUTO: Any active channel if program to "auto-initial enable", when TC (or EOP) high will switch to this state after finish current data transfer. Next state will be T_NOHLDA. When active channel in chaining mode, TC (or EOP) high and "base_updated" flag set, it will switch to this state also. Action: Base target address will load to current target address (dma_tar_reg) base requestor address will load to current request address (dma_rq_reg) base count register will load to current byte count register (dma_bcreg). 22) T_DMND: When active channel in demand mode when TC (or EOP) inactive but DRQ low, or in signal mode when TC (or EOP) inactive, it will switch to this state. Next state is T_NOHLDA. Action: Current target address register and current byte count register get recovered by incrementor/decrementor. 23) T_TERMI: When active channel get TC (or EOP) high, but channel not programmed "auto-initial". Action: Masks off active channel. 24) T_NOHOLD: This is last state in dma. It stay here until CPU_HLDA low and next state if T_I (idle). Action: Take CPU_HOLD low and wait CPU hold acknowledge inactive. 25) If active channel program to "CASCADE master" mode. It will switch here from T_DCK and s1. Action: all address, data bus, dma command will tri_stated.

Detailed schematics for the DMA state machine and timing control logic 108 can be generated from the Verilog code shown in Appendix E which is attached hereto and which is incorporated herein by reference.

Referring again to FIG. 1, the specific DMA controller 50 port definitions for CPU local bus 68 are as follows. CA_OUT[31:0] is the CPU address bits 31–0. The DMA controller 50 only drives the CPU address bus when it becomes master of the system. CPU_CLK is the clock. This signal is the equivalent of the CPU clock except when this clock is disabled, or when the CPU clock is disabled. CPU_[15:0] is the CPU data bits 15–0. During DMA controlled transfers the DMA controller 50 uses this 16-bit bus to present write data and receive read data from the DMA's target memory (DRAM or SRAM). CPU_HOLD is the CPU hold request. The DMA controller 50 uses this signal to request mastership of the system from the CPU. DMA_ADS_Z is the DMA address strobe signal. This signal drives the CPU local bus's address strobe signal when the DMA controller 50 is the master of the system. The DMA controller 50 uses this signal to indicate the first T-state of every access to the DMA's target memory (DRAM or SRAM). DMA_BHE_Z is the DMA byte high enable signal. This signal drives the CPU local bus's byte high enable signal when the DMA controller 50 is the master of the system. The DMA controller 50 uses this signal to indicate whether the high byte (odd byte) on the CPU local data bus is an active byte or not. DMA_D_C_Z is the DMA data/code signal. This signal always drives the CPU local bus's data/code signal with a one (i.e. always data), when the DMA controller 50 is the master of the system. DMA_M_IO is the DMA memory/IO signal. This signal always drives the CPU local bus's memory/IO signal with a one (i.e. always memory), when the DMA controller 50 is the master of the system. DMA_R_W_Z is the DMA write/read signal. This signal drives the CPU local bus's write/read signal when the DMA controller 50 is the master of the system. A one will be driven when writing to the DMA's target memory (DMA read mode) and a zero will be driven when reading from the DMA's target memory (DMA write mode). HLDA is the hold acknowledge. This input is the CPU's hold acknowledge signal.

The specific DMA controller 50 port definitions for the BIU interface signals 62 are as follows. DMA_SIO_R_Z is the DMA system IO read output strobe. The DMA controller 50 produces a DMA requester IO read strobe for IO Reads from IO Reads from IO mapped DMA requesters (DMA Read Mode, IO Device Type). This signal is sent to the BIU 62 to be logically combined with the IO read strobe produced by the BIU 62. DMA_SIO_W_Z is the DMA system IO write output strobe. The DMA controller 50 produces a DMA requester IO write strobe for IO writes to IO mapped DMA requesters (DMA write mode, IO device type). This signal is sent to the BIU 62 to be logically combined with the IO write strobe produces by the BIU 62. DMA_SM_R_Z is the DMA system memory read output strobe. The DMA controller 50 produces a DMA requester memory read strobe for memory reads from memory mapped DMA requesters (DMA read Mode, memory device type). This signal is sent to the BIU 62 to be logically combined with the memory read strobe produces by the BIU 62. DMA_SM_W_Z is the DMA system memory write output strobe. The DMA controller 50 produces a DMA requester memory write strobe for memory writes to memory mapped DMA requesters (DMA write mode, memory device type). This signal is sent to the BIU 62 to be logically combined with the memory write strobe produces by the BIU 62. DRAM_CAS is the DRAM column address strobe like input signal. This signal is the combination of all of the DRAM CAS signals and a CAS-like signal generated within the BIU 62. When this signal is a zero it indicates to the DMA controller 50 that valid data is present on the CPU local data bus 68. DRM_RDY is the DRAM ready input signal. This signal is actually the DMA's target memory ready signal, which may come from either the DRAM controller 64 or the BIU 62. The BIU 62 combines these two ready sources into this single signal for the DMA controller 50. RESET is the reset input signal. This active-high input signal places the DMA controller 50 in a know state. SLV_RDY is the slave ready input signal. This signal is the combination of the RDY signal from the pin and the BIU 62's DSP communications logic. The BIU 62 combines the two sources into this single signal for the DMA controller 50.

The specific DMA controller 50 port definitions for the external ISA-like interface bus 74 are as follows. DACK_

Z[6,4,2,0] is the even numbered DMA acknowledge output signals. These signals acknowledge to the externally connected DMA devices that they have won the DMA arbitration and are now the active DMA channel. DRQ[6,4,2,0] is the even numbered DMA request input signals. These DMA request signals are driven by external DMA requester devices, when requesting DMA transfer control. EOP is the end of process input signal. This active-high input signal may be driven high to terminate a DMA transfer sequence. The action of driving EOP high, will appear to be the same as when a DMA channel reaches terminal count, except that fewer transfers may have been performed. EOP_TC_Z is the EOP or TC selection signal. This signal indicates whether the EOP input or the TC output signal should be in control of the TC/EOP signal pin. When this signal is a zero, the TC/EOP signal pin acts as a TC output pin. SD_BUS [15:0] is the input side of the external ISA-like interface system data bus. The DMA controller 50 only uses this bus to read external DMA requester read data. SD_OUT[15:0] is the output side of the external ISA-like interface system data bus. The DMA controller 50 only drives this bus during DMA requester write data cycles.

The specific DMA controller 50 port definitions for the internal peripheral bus 72 are as follows. BHE_Z is the byte high enable active-low input signal. This signal is used during programming of the DMA controller 50 to indicate whether the high byte of the data on the internal peripheral bus is active (BHE_Z) or not (BHE_Z=1). CS_DMA is the DMA chip select input signal. This signal will go active high whenever an access is taking place to the DMA controller 50. The DMA controller 50 uses this signal to decodes accesses to it. D_BIU[15:0] is the internal peripheral data bus bits 15–0. The DMA controller 50 is programmed via this internal data bus; this bus is also used to perform DMA transfers to/from internal DMA requesters. IO_R_Z is the internal peripheral bus IO read strobe. The DMA controller 50 uses this input signal in combination with the CS_DMA signal to determine when it is being read. The specific register being read is further determined by the SA_IN[7:0] and BHE_Z signals. IO_W_Z is the internal peripheral bus IO write strobe. The DMA controller 50 uses this input this input signal in combination with the CS_DMA signal to determine when it is being written. The specific register being read is further determined by the SA_IN[7:0] and BHE_Z signals. SA_IN[7:0] is the internal peripheral bus system address bits 7–0. These low address bits along with BHE_Z determine specifically, which registers are being accessed, when the CS_DMA signal is active high and either IO_R_Z or IOW_Z strobes active low.

Other specific port definitions for the DMA controller 50 are as follows. CHAINING_INT is the chaining interrupt request output signal. This interrupt request signal pulses active high to request an update to the chaining channel's base address and base count registers. The interrupt steering logic (in the configuration module) will determine which internal interrupt request this signal will drive. DACK_Z [5,3,1] is the three odd numbered DMA Acknowledge active-low output signals. These three acknowledge signals may be steered to the desired internal DMA requester via DMA steering logic provided in the configuration module. The internal DMA acknowledges will go active low to indicate which channel's DMA request has been granted. DRQ[5,3,1] is the three odd numbered DMA request input signals. These three request signals may be steered to the desired internal DMA requester via DMA steering logic provided in the configuration module. The internal DMA request signals should be driven active high by the selected internal DMA requester when that requester desires DMA transfer(s).

FIGS. 20–30 illustrate the operation of the DMA controller 50.

The invention embodiments described herein have been implemented in an integrated circuit which includes a number of additional functions and features which are described in the following co-pending, commonly assigned patent applications, the disclosure of each of which is incorporated herein by reference: U.S. patent application Ser. No. 08/451,319, entitled "DISPLAY CONTROLLER CAPABLE OF ACCESSING AN EXTERNAL MEMORY FOR GRAY SCALE MODULATION DATA" (atty. docket no. NSC1-62700); U.S. patent application Ser. No. 08/451,965, entitled "SERIAL INTERFACE CAPABLE OF OPERATING IN TWO DIFFERENT SERIAL DATA TRANSFER MODES" (atty. docket no. NSC1-62800); U.S. patent application Ser. No. 08/453,076, entitled "HIGH PERFORMANCE MULTIFUNCTION DIRECT MEMORY ACCESS (DMA) CONTROLLER" (atty. docket no. NSC1-62900); U.S. patent application Ser. No. 08/452,001, entitled "OPEN DRAIN MULTI-SOURCE CLOCK GENERATOR HAVING MINIMUM PULSE WIDTH" (atty. docket no. NSC1-63000); U.S. patent application Ser. No. 08/451,503, entitled "INTEGRATED CIRCUIT WITH MULTIPLE FUNCTIONS SHARING MULTIPLE INTERNAL SIGNAL BUSES ACCORDING TO DISTRIBUTED BUS ACCESS AND CONTROL ARBITRATION" (atty. docket no. NSC1-63100); U.S. patent application Ser. No. 08/451,974, entitled "EXECUTION UNIT ARCHITECTURE TO SUPPORT x86 INSTRUCTION SET AND x86 SEGMENTED ADDRESSING" (atty. docket no. NSC1-63300); U.S. patent application Ser. No. 08/451,444, entitled "BARREL SHIFTER" (atty. docket no. NSC1-63400); U.S. patent application Ser. No. 08/451,204, entitled "BIT SEARCHING THROUGH 8, 16, OR 32-BIT OPERANDS USING A 32-BIT DATA PATH" (atty. docket no. NSC1-63500); U.S. patent application Ser. No. 08/451,195, entitled "DOUBLE PRECISION (64-BIT) SHIFT OPERATIONS USING A 32-BIT DATA PATH" (atty. docket no. NSC1-63600); U.S. patent application Ser. No. 08/451,571, entitled "METHOD FOR PERFORMING SIGNED DIVISION" (atty. docket no. NSC1-63700); U.S. patent application Ser. No. 08/452,162, entitled "METHOD FOR PERFORMING ROTATE THROUGH CARRY USING A 32-BIT BARREL SHIFTER AND COUNTER" (atty. docket no. NSC1-63800); U.S. patent application Ser. No. 08/451,434, entitled "AREA AND TIME EFFICIENT FIELD EXTRACTION CIRCUIT" (atty. docket no. NSC1-63900); U.S. patent application Ser. No. 08/451,535, entitled "NON-ARITHMETICAL CIRCULAR BUFFER CELL AVAILABILITY STATUS INDICATOR CIRCUIT" (atty. docket no. NSC1-64000); U.S. patent application Ser. No. 08/445,563, entitled "TAGGED PREFETCH AND INSTRUCTION DECODER FOR VARIABLE LENGTH INSTRUCTION SET AND METHOD OF OPERATION" (atty. docket no. NSC1-64100); U.S. patent application Ser. No. 08/450,183 entitled "PARTITIONED DECODER CIRCUIT FOR LOW POWER OPERATION" (atty. docket no. NSC1-64200); U.S. patent application Ser. No. 08/451,495, entitled "CIRCUIT FOR DESIGNATING INSTRUCTION POINTERS FOR USE BY A PROCESSOR DECODER" (atty. docket no. NSC1-64300); U.S. patent application Ser. No. 08/451,150, entitled "CIRCUIT FOR GENERATING A DEMAND-BASED GATED CLOCK" (atty. docket no. NSC1-64500); U.S. patent application Ser. No. 08/451,214, entitled "INCREMENTOR/DECREMENTOR" (atty. docket no. NSC1-64700); U.S. patent application Ser. No. 08/451,150, entitled "A PIPELINED MICROPROCESSOR THAT PIPELINES MEMORY REQUESTS TO AN EXTERNAL MEMORY" (atty. docket no. NSC1-64800); U.S. patent application Ser. No. 08/451,198, entitled "CODE BREAKPOINT DECODER" (atty. docket no. NSC1-64900); U.S. patent application Ser. No. 08/445,569, entitled "TWO TIER PREFETCH BUFFER STRUCTURE AND METHOD WITH BYPASS" (atty. docket no. NSC1-65000); U.S. patent application Ser. No. 08/445,564, entitled "INSTRUCTION LIMIT CHECK FOR MICROPROCESSOR" (atty. docket no. NSC1-65100); U.S. patent application Ser. No. 08/452,306, entitled "A PIPELINED MICROPROCESSOR THAT MAKES MEMORY REQUESTS TO A CACHE MEMORY AND AN EXTERNAL MEMORY CONTROLLER DURING THE SAME CLOCK CYCLE" (atty. docket no. NSC1-65200); U.S. patent application Ser. No. 08/452,080, entitled "APPARATUS AND METHOD FOR EFFICIENT COMPUTATION OF A 486™ MICROPROCESSOR COMPATIBLE POP INSTRUCTION" (atty. docket no. NSC1-657000); U.S. patent application Ser. No. 08/450,154, entitled "APPARATUS AND METHOD FOR EFFICIENTLY DETERMINING ADDRESSES FOR MISALIGNED DATA STORED IN MEMORY" (atty. docket no. NSC1-65800); U.S. patent application Ser. No. 08/451,742, entitled "METHOD OF IMPLEMENTING FAST 486™ MICROPROCESSOR COMPATIBLE STRING OPERATION" (atty. docket no. NSC1-65900); U.S. patent application Ser. No. 08/452,659, entitled "A PIPELINED MICROPROCESSOR THAT PREVENTS THE CACHE FROM BEING READ WHEN THE CONTENTS OF THE CACHE ARE INVALID" (atty. docket no. NSC1-66000); U.S. patent application Ser. No. 08/451,507, entitled "DRAM CONTROLLER THAT REDUCES THE TIME REQUIRED TO PROCESS MEMORY REQUESTS" (atty. docket no. NSC1-66300); U.S. patent application Ser. No. 08/451,420, entitled "INTEGRATED PRIMARY BUS AND SECONDARY BUS CONTROLLER WITH REDUCED PIN COUNT" (atty. docket no. NSC1-66400); U.S. patent application Ser. No. 08/452,365, entitled "SUPPLY AND INTERFACE CONFIGURABLE INPUT/OUTPUT BUFFER" (atty. docket no. NSC1-66500); U.S. patent application Ser. No. 08/451,744, entitled "CLOCK GENERATION CIRCUIT FOR A DISPLAY CONTROLLER HAVING A FINE TUNEABLE FRAME RATE" (atty. docket no. NSC1-66600); U.S. patent application Ser. No. 08/451,206, entitled "CONFIGURABLE POWER MANAGEMENT SCHEME" (atty. docket no. NSC1-66700); U.S. patent application Ser. No. 08/452,350, entitled "BIDIRECTIONAL PARALLEL SIGNAL INTERFACE" (atty. docket no. NSC1-67000); U.S. patent application Ser. No. 08/452,094, entitled "LIQUID CRYSTAL DISPLAY (LCD) PROTECTION CIRCUIT" (atty. docket no. NSC1-67100); U.S. patent application Ser. No. 08/450,156, entitled "DISPLAY CONTROLLER CAPABLE OF ACCESSING GRAPHICS DATA FROM A SHARED SYSTEM MEMORY" (atty. docket no. NSC1-67500); U.S. patent application Ser. No. 08/450,726, entitled "INTEGRATED CIRCUIT WITH TEST SIGNAL BUSES AND TEST CONTROL CIRCUITS" (atty. docket no. NSC1-67600); U.S. patent application Ser. No. 08/445,568, entitled "DECODE BLOCK TEST METHOD AND APPARATUS" (atty. docket no. NSC1-68000).

It should be understood that various alternatives to the embodiments of the invention described herein may be employed in practicing the invention. It is intended that the following claims define the scope of the invention and that structures and methods within the scope of these claims and their equivalents be covered thereby.

What is claimed is:

1. A direct memory access (DMA) controller, comprising:
   a channel circuit connected to transfer data to and from a port;
   a CPU interface;
   a bus connected to the channel circuit and to the CPU interface and configured to transfer data therebetween;
   a state machine coupled to the CPU interface and configured to process a clock signal which controls a transfer of data from the channel circuit across the bus to the CPU interface and to delay the transfer of data for a preprogrammed number of clock cycles in response to a wait signal, the state machine including a wait signal generation circuit configured to generate the wait signal; and
   a data mode register configured to receive a wait number which corresponds to the preprogrammed number of clock cycles;
   wherein the wait signal generation circuit includes circuitry configured to receive the wait number, decrement the wait number by one during each cycle of the clock signal, and to generate the wait signal in response to decrementation of the wait number.

2. A DMA controller according to claim 1, wherein the wait signal generation circuit comprises:
   a plurality of flip-flops coupled to the data mode register and configured to each receive one bit of the wait number; and
   a decrement circuit coupled to an output of each flip-flop and configured to decrement the wait number by one during each cycle of the clock signal.

3. A DMA controller according to claim 2, wherein the wait signal generation circuit further comprises:
   an OR gate coupled to the output of each flip-flop and configured to generate the wait signal.

4. A DMA controller according to claim 2, wherein the wait number is three bits wide and the plurality of flip-flops comprises three flip-flops.

5. A direct memory access (DMA) controller, comprising:
   a channel circuit configured to connect to and transfer data to and from an input/output device;
   a data mode register configured to receive a wait number; and
   a state machine coupled to the channel circuit and the data mode register and configured to process a clock signal which controls a transfer of data through the channel circuit and to delay the transfer of data for a preprogrammed number of clock cycles determined by the wait number in response to a wait signal, the state machine including a wait signal generation circuit configured to receive the wait number from the data mode register, decrement the wait number by one during each cycle of the clock signal, and to generate the wait signal in response to decrementation of the wait number.

6. A DMA controller according to claim 5, wherein the wait signal generation circuit comprises:
   a plurality of flip-flops coupled to the data mode register and configured to each receive one bit of the wait number; and
   a decrement circuit coupled to an output of each flip-flop and configured to decrement the wait number by one during each cycle of the clock signal.

7. A DMA controller according to claim 6, wherein the wait signal generation circuit further comprises:

an OR gate coupled to the output of each flip-flop and configured to generate the wait signal.

8. A DMA controller according to claim 6, wherein the wait number is three bits wide and the plurality of flip-flops comprises three flip-flops.

9. A direct memory access (DMA) controller, comprising:

a channel circuit configured to connect to and transfer data to and from an input/output device;

a data mode register configured to receive a wait number; and a state machine coupled to the channel circuit and the data mode register and configured to process a clock signal which controls a transfer of data through the channel circuit and to delay the transfer of data for a preprogrammed number of clock cycles determined by the wait number in response to a wait signal, the state machine including,
 a plurality of flip-flops coupled to the data mode register and configured to each receive one bit of the wait number; and
 a decrement circuit coupled to an output of each flip-flop and configured to decrement the wait number by one during each cycle of the clock signal; and
 an OR gate coupled to the output of each flip-flop and configured to generate the wait signal.

10. A DMA controller according to claim 9, wherein the wait number is three bits wide and the plurality of flip-flops comprises three flip-flops.

11. A method of performing a direct memory access (DMA) transfer of data, comprising the steps of:

establishing a channel circuit configured to connect to and transfer data to and from an input/output device;

processing a clock signal to control a transfer of data through the channel circuit;

storing a wait number in a data mode register;

decrementing the wait number by one during each cycle of the clock signal;

generating a wait signal in response to decrementation of the wait number; and delaying the transfer of data for a preprogrammed number of clock cycles corresponding to the wait number in response to the wait signal.

12. A method according to claim 11, wherein the step of decrementing the wait number by one during each cycle of the clock signal comprises the steps of:

loading each bit of the wait number into a separate one of a plurality of flip-flops each having an output; and decrementing a number formed by the outputs of the plurality of flip-flops by one during each cycle of the clock signal.

13. A method according to claim 12, wherein the step of generating a wait signal in response to decrementation of the wait number comprises the steps of:

ORing together the outputs of the plurality of flip-flops.

* * * * *